US012722924B2

(12) United States Patent
Vernay

(10) Patent No.: US 12,722,924 B2
(45) Date of Patent: Sep. 1, 2026

(54) CONVERTING MACHINE WITH INVERSION TRANSFER MODULE

(71) Applicant: BOBST LYON, Bron (FR)

(72) Inventor: Eric Vernay, Orlićnas (FR)

(73) Assignee: BOBST LYON, Bron (FR)

( * ) Notice: Subject to any disclaimer, the term of this patent is extended or adjusted under 35 U.S.C. 154(b) by 613 days.

(21) Appl. No.: 18/253,105

(22) PCT Filed: Nov. 16, 2021

(86) PCT No.: PCT/EP2021/081833
§ 371 (c)(1),
(2) Date: May 16, 2023

(87) PCT Pub. No.: WO2022/106411
PCT Pub. Date: May 27, 2022

(65) Prior Publication Data
US 2025/0026123 A1 Jan. 23, 2025

(30) Foreign Application Priority Data
Nov. 19, 2020 (EP) .................................... 20315459

(51) Int. Cl.
*B65H 5/22* (2006.01)
*B31B 50/00* (2017.01)
(Continued)

(52) U.S. Cl.
CPC ........... *B65H 5/222* (2013.01); *B31B 50/002* (2017.08); *B31B 50/005* (2017.08);
(Continued)

(58) Field of Classification Search
CPC ... B31B 50/002; B31B 50/005; B31B 50/042; B31B 50/06; B31B 50/07; B31B 50/146;
(Continued)

(56) References Cited

U.S. PATENT DOCUMENTS 4,909,500 A 3/1990 Grutzmacher et al.
5,004,221 A 4/1991 Stark
(Continued)

FOREIGN PATENT DOCUMENTS

CN 101428713 A 5/2009
CN 106660375 A 5/2017
(Continued)

*Primary Examiner* — Stephen D Meier
*Assistant Examiner* — Leo T Hinze
(74) *Attorney, Agent, or Firm* — Bookoff McAndrews, PLLC

(57) ABSTRACT

The present invention relates to a converting machine provided with an inversion transfer module (60). The converting machine comprises a printing module (16) comprising a first printing unit (17) arranged to print on a top side (S1) of a sheet (1), and a second printing unit (17') arranged to print a bottom side (S2) of the sheet. The inversion transfer module is arranged between the first printing unit and the second printing unit and comprises a first and a second inversion vacuum transfers (62, 64) which are configured to change the side of adherence and transportation of the sheet.

20 Claims, 15 Drawing Sheets

(51) Int. Cl.

| | |
|---|---|
| ***B31B 50/04*** | (2017.01) |
| ***B31B 50/06*** | (2017.01) |
| ***B31B 50/07*** | (2017.01) |
| ***B31B 50/14*** | (2017.01) |
| ***B31B 50/22*** | (2017.01) |
| ***B31B 50/88*** | (2017.01) |
| ***B31B 50/98*** | (2017.01) |
| ***B41F 5/02*** | (2006.01) |
| ***B41F 5/24*** | (2006.01) |
| ***B41F 13/00*** | (2006.01) |
| ***B41F 13/56*** | (2006.01) |
| ***B41F 19/00*** | (2006.01) |
| ***B41F 21/00*** | (2006.01) |
| ***B41F 21/10*** | (2006.01) |
| ***B41F 33/08*** | (2006.01) |
| ***B65H 5/38*** | (2006.01) |
| ***B65H 29/24*** | (2006.01) |
| ***B65H 29/52*** | (2006.01) |

(52) U.S. Cl.

CPC ............ *B31B 50/042* (2017.08); *B31B 50/06* (2017.08); *B31B 50/07* (2017.08); *B31B 50/146* (2017.08); *B31B 50/22* (2017.08); *B31B 50/88* (2017.08); *B31B 50/98* (2017.08); *B41F 5/02* (2013.01); *B41F 5/24* (2013.01); *B41F 13/0024* (2013.01); *B41F 13/56* (2013.01); *B41F 19/008* (2013.01); *B41F 21/00* (2013.01); *B41F 21/106* (2013.01); *B41F 33/08* (2013.01); *B65H 5/38* (2013.01); *B65H 29/241* (2013.01); *B65H 29/52* (2013.01); *B65H 2301/44734* (2013.01); *B65H 2301/44735* (2013.01); *B65H 2402/10* (2013.01); *B65H 2402/60* (2013.01); *B65H 2406/3122* (2013.01); *B65H 2406/3124* (2013.01); *B65H 2406/362* (2013.01); *B65H 2701/1764* (2013.01); *B65H 2801/21* (2013.01)

(58) Field of Classification Search

CPC ......... B31B 50/22; B31B 50/88; B31B 50/98; B41F 5/02; B41F 5/24; B41F 13/0024; B41F 13/56; B41F 19/008; B41F 21/00; B41F 21/106; B41F 33/08; B65H 5/222; B65H 5/38; B65H 29/241; B65H 29/52; B65H 2301/44734; B65H 2301/44735; B65H 2402/10; B65H 2402/60; B65H 2406/3122; B65H 2406/3124; B65H 2406/362; B65H 2701/1764; B65H 2801/21

See application file for complete search history.

(56) References Cited

U.S. PATENT DOCUMENTS

| | | | | |
|---|---|---|---|---|
| 5,509,352 | A | 4/1996 | Kowalewski et al. | |
| 5,651,313 | A | 7/1997 | Kowalewski et al. | |
| 5,671,676 | A * | 9/1997 | Baba | B41F 31/025 101/425 |
| 6,311,032 | B1 | 10/2001 | Carter, Jr. et al. | |
| 8,308,287 | B2 * | 11/2012 | Ebihara | B41J 11/0085 347/108 |
| 11,772,922 | B2 | 10/2023 | Fuwa | |
| 2012/0153563 | A1 | 6/2012 | Schulze-Hagenest et al. | |
| 2019/0270323 | A1 * | 9/2019 | Bernard | B41J 11/00214 |
| 2020/0070498 | A1 * | 3/2020 | Kawai | G03G 15/5062 |
| 2021/0094778 | A1 | 4/2021 | Fukumoto et al. | |

FOREIGN PATENT DOCUMENTS

| | | | |
|---|---|---|---|
| CN | 107472946 | A | 12/2017 |
| CN | 109130478 | A | 1/2019 |
| CN | 109153271 | A | 1/2019 |
| CN | 109153272 | A | 1/2019 |
| CN | 109719993 | A | 5/2019 |
| CN | 209973801 | U | 1/2020 |
| CN | 116568619 | A | 8/2023 |
| DE | 102016223225 | A1 | 5/2017 |
| DE | 102016223226 | A1 | 5/2017 |
| DE | 102017212987 | A1 | 1/2019 |
| EP | 0615941 | A1 | 9/1994 |
| EP | 0726221 | A2 | 8/1996 |
| EP | 1022121 | A2 | 7/2000 |
| EP | 2385007 | A2 | 11/2011 |
| EP | 2660174 | A2 | 11/2013 |
| EP | 3800148 | A1 | 4/2021 |
| JP | H07156304 | A | 6/1995 |
| JP | 2000211040 | A | 8/2000 |
| JP | 2002311660 | A | 10/2002 |
| JP | 2010126269 | A | 6/2010 |
| JP | 3186026 | U | 8/2013 |
| JP | 2013234070 | A | 11/2013 |
| JP | 2014156322 | A | 8/2014 |
| JP | 2018514419 | A | 6/2018 |
| JP | 2020524120 | A | 8/2020 |
| KR | 1020130045175 | A | 5/2013 |
| NL | 275252 | A | 10/1964 |
| WO | 2017202846 | A1 | 11/2017 |

* cited by examiner

CONVERTING MACHINE WITH INVERSION TRANSFER MODULE

CROSS-REFERENCE TO RELATED APPLICATION(S)

This application is a National Stage Application under 35 U.S.C. § 371 of International Application No. PCT/EP2021/081883, filed on Nov. 16, 2021, which claims priority to European Application No. 20315459.6, filed on Nov. 19, 2020, the entireties of which are incorporated herein by reference.

TECHNICAL FIELD OF THE INVENTION

The present invention relates to a converting machine which is suitable in the production of paper or cardboard boxes having a printed pattern on both the inside surface and the outside surface.

BACKGROUND OF THE INVENTION

In the packaging industry, boxes are typically produced from corrugated cardboard or paperboard sheet substrates. There are two main types of boxes; folded slotted boxes (also sometimes referred to as "folding boxes") and flat-packed boxes. The folded slotted boxes are folded and glued together in a converting machine, whereas the flat-packed boxes are provided as flat sheets from the converting machine and are subsequently folded and potentially closed (e.g. with an adhesive tape) when provided with their final content.

The present invention relates to a converting machine comprising printing units. Such a converting machine can be configured as a rotary die-cutting machine suitable for producing printed flat-packed boxes, or as a flexo-folder-gluer converting machine for producing folded slotted boxes. Taking the rotary die cutting machine as an example, it comprises a series of modules including a feeder module, a flexographic printing module, a die-cutter module and typically a stacker module.

Cardboard or paperboard boxes are typically provided with a printed pattern on the outside surface. In a standard outside-printing process, flexographic printing cylinders in the converting machine are typically located below the sheet and configured to print on the bottom side of the sheet. The bottom side of the sheet may then represent the outside surface of the box.

It is sometimes also desirable to print on the inside of the box. By also printing on the inside, further information or ornamental patterns can be provided on the inside surface of the box. In order to print on both the outside and the inside of the box, the flexographic printing module further needs to include at least one additional flexographic printing unit having a printing cylinder arranged to print on the top side of the sheet.

When the sheet is printed from underneath, the sheet needs to be conveyed on the top side. Conversely, if the sheet is to be printed on the top surface, the sheet needs to be conveyed on the bottom side.

The transportation and adherence of the sheet is partly achieved with transportation elements and vacuum suction units which are configured to apply suction in an alternating manner against the bottom side and the top side of the sheet. This arrangement drives and maintains the sheet in the desired vertical position against the printing cylinders inside the converting machine.

For a double-sided printing process, there is a need to transition/switch the side of conveyance of the sheet between the upper and bottom flexographic printing cylinders. However, this change in conveyance and adherence causes the sheet to vertically change direction. This may cause a disruption, such as to cause undesirable register shifts and further misalignments of the downstream-located printing, cutting and creasing operations.

SUMMARY OF THE INVENTION

In view of the above-mentioned problem, it is an object of the present invention to provide a converting machine with a smooth and controlled transition of the sheet between a top printing unit and a bottom printing unit.

The object of the present invention is solved by a converting machine according to claim 1.

According to a first aspect of the present invention, there is provided a converting machine for printing and transforming a sheet into a packaging element for a box, the converting machine comprising:

- A printing module comprising a first printing unit arranged to print on a top side of a sheet, and a second printing unit arranged to print on a bottom side of the sheet,
- A conveying system configured to transport the sheet through the converting machine along a transportation path in a direction of conveyance, the conveying system comprising a first transfer unit configured to contact and transport the sheet on the bottom side of the sheet and a second transfer unit configured to contact and transport the sheet on the top side of the sheet, the transfer units comprising drive elements configured to move the sheet forward in the direction of conveyance and vacuum apertures arranged to adhere the sheet to the drive elements,
- wherein the converting machine further comprises an inversion transfer module arranged between the first printing unit and the second printing unit, the inversion transfer module comprising an inlet inversion vacuum transfer and an outlet inversion vacuum transfer, each configured to contact and transport a different side of the sheet, whereby the inversion transfer module is configured to change the side of adherence and transportation of the sheet.

The invention is based on a realization that a controlled change of the side of conveyance of the sheet can be achieved in a dedicated module, which is configured to take control over the conveyance of the sheet. Hence, the inversion transfer module vertically displaces the sheet at the same time as the side of conveyance changes.

The packaging element can be a flat-packed box, a folded slotted box or a folding box. The packaging element is preferably made from cardboard or paperboard.

In an embodiment, the printing module is a flexographic printing module and the first printing unit comprises a top printing cylinder arranged to print on a top side of a sheet, and a second printing unit having a bottom printing cylinder arranged to print on a bottom side of the sheet.

In an embodiment, the printing module is an offset printing module and the first printing unit comprises a top printing cylinder arranged to print on a top side of a sheet, and a second printing unit having a bottom printing cylinder arranged to print on a bottom side of the sheet.

In an embodiment, the first printing unit is an ink-jet printing unit configured to print on the top side of the sheet, and the second printing unit is a flexographic printing module configured to print on the bottom side of the sheet.

In an embodiment, the converting machine is in the configuration of a rotary die cutter. In another embodiment, the converting machine is in the configuration of a flexo-folder-gluer.

In an embodiment, the first flexographic printing unit is arranged upstream of the second flexographic printing unit in the direction of conveyance, and the inlet inversion vacuum transfer is configured to apply suction to the bottom side of the sheet. The inlet inversion vacuum transfer is thus configured to make the bottom side of the sheet adhere to drive elements of the inlet inversion transfer.

In an embodiment, the inlet inversion vacuum transfer is driven in unison with an adjacent transfer unit of the closest upstream-located printing unit. The speed of the inlet inversion vacuum transfer is equal to the speed of the transfer unit of the closest upstream-located printing unit.

In an embodiment, the outlet inversion vacuum-transfer is driven in unison with the transfer unit of the closest downstream-located printing unit. The speed of the outlet inversion vacuum transfer is equal to the speed of the transfer unit of the closest downstream-located flexographic printing unit.

In an embodiment, the converting machine further comprises a die-cutting module located downstream of the printing module in the direction of conveyance.

In an embodiment, the converting machine comprises a mobile part and a fixed part, and the inversion transfer module is arranged as a transition element between the mobile part and the fixed part. The mobile part comprises modules which are displaceable on a floor. The fixed part comprises modules which are stationary mounted on the floor.

In an embodiment, the inversion transfer module is provided with displacement means, enabling a horizontal displacement of the inversion transfer module in relation to a flexographic printing unit. The displacement means can be wheels, rollers or a slide rail.

According to another aspect of the present invention there is provided an inversion transfer module for a converting machine having a flexographic printing module comprising at least one first flexographic printing unit having a top printing cylinder arranged to print on a top side of a sheet, and at least one second flexographic printing unit having a bottom printing cylinder arranged to print a bottom side of the sheet, the inversion transfer module being configured to convey the sheet between the at least one first flexographic printing unit and the at least one second flexographic printing unit, and wherein the inversion transfer module comprises an inlet inversion vacuum transfer and an outlet inversion vacuum transfer, each configured to contact and transport a different side of the sheet, whereby the inversion transfer module is configured to change the side of adherence and transportation of the sheet.

In an embodiment, the printing module is a flexographic printing module and wherein the first printing unit comprises a top printing cylinder arranged to print on a top side of a sheet, and a second printing unit having a bottom printing cylinder arranged to print on a bottom side of the sheet.

In an embodiment, the inversion transfer module further comprises a pivotably movable locking part connected to a housing of the inversion transfer module. The pivotably movable locking part may be configured to engage with a corresponding mating geometry in a printing module such as to mechanically connect the housing of the inversion transfer module with a housing of the printing unit.

In an embodiment, the inversion transfer module further comprises a first deflector arranged in an angle and defining an entry clearance and an exit clearance with the inlet inversion vacuum transfer, wherein the entry clearance is larger than the exit clearance, such that a funnel-shaped entry passage to the outlet inversion vacuum transfer is provided.

In an embodiment, the inversion transfer module comprises a second horizontally arranged deflector defining an entry clearance and an exit clearance with the outlet inversion transfer, wherein the deflector is parallel to the outlet inversion vacuum transfer.

In an embodiment, the inlet inversion vacuum transfer is connected to a first vacuum generator and the outlet inversion vacuum transfer is connected to a second vacuum generator.

In an embodiment, the vacuum-suction force of the inversion vacuum transfer configured to apply suction to the top side of the sheet is higher than the vacuum-suction force to the inversion vacuum transfer configured to apply suction to the bottom side of the sheet.

In an embodiment, the inversion transfer module further comprises a structural frame, wherein the upper and lower inversion vacuum transfers are mounted on the same structural frame. The structural frame is separate from the flexographic printing module.

In an embodiment, the inversion transfer module is provided with displacement means, enabling a horizontal displacement of the inversion transfer module. The displacement means can be wheels, rollers or guide rail.

In an embodiment, a housing of the inversion vacuum transfer configured to apply suction to the top side of the sheet comprises separate suction compartments connected to an upper vacuum generator.

The compartments may be defined by internal walls extending in the direction of conveyance and are arranged such that a centrally arranged suction compartment is provided, the centrally arranged suction compartment being arranged in-between a first lateral suction compartment and a second lateral suction compartment.

In an embodiment, the internal walls are configured as movable shutters, and wherein the suction force from the vacuum generator can be distributed to the first lateral suction box and a second lateral suction box the by opening the shutters.

BRIEF DESCRIPTION OF THE DRAWINGS

Further advantages and features will become apparent from the following description of exemplary embodiments of the present invention and from the appended figures, in which like features are denoted with the same reference numbers and in which.

DETAILED DESCRIPTION

Figure 1C:
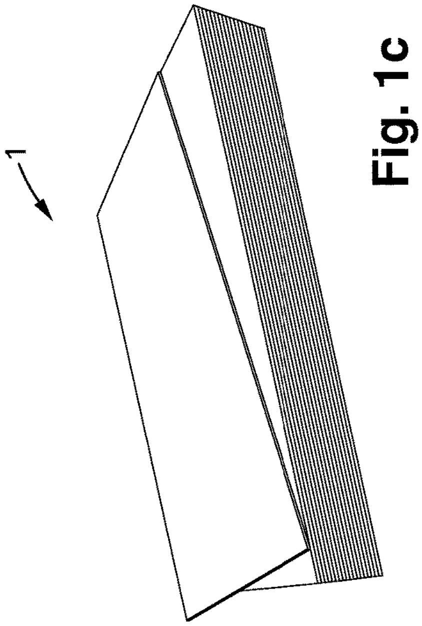
FIG. 1*c* illustrates a schematic view of a stack of sheet substrates.
Figure 1B:
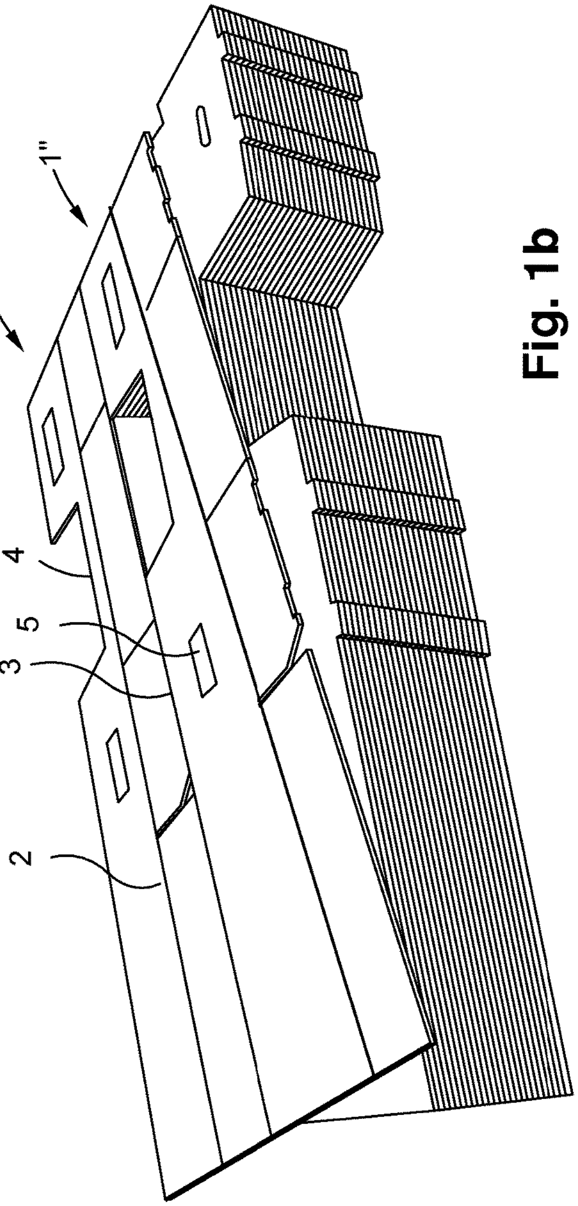
FIGS. 1*a* and 1*b* show a flat-packed box after and before assembly, respectively.
Figure 1A:
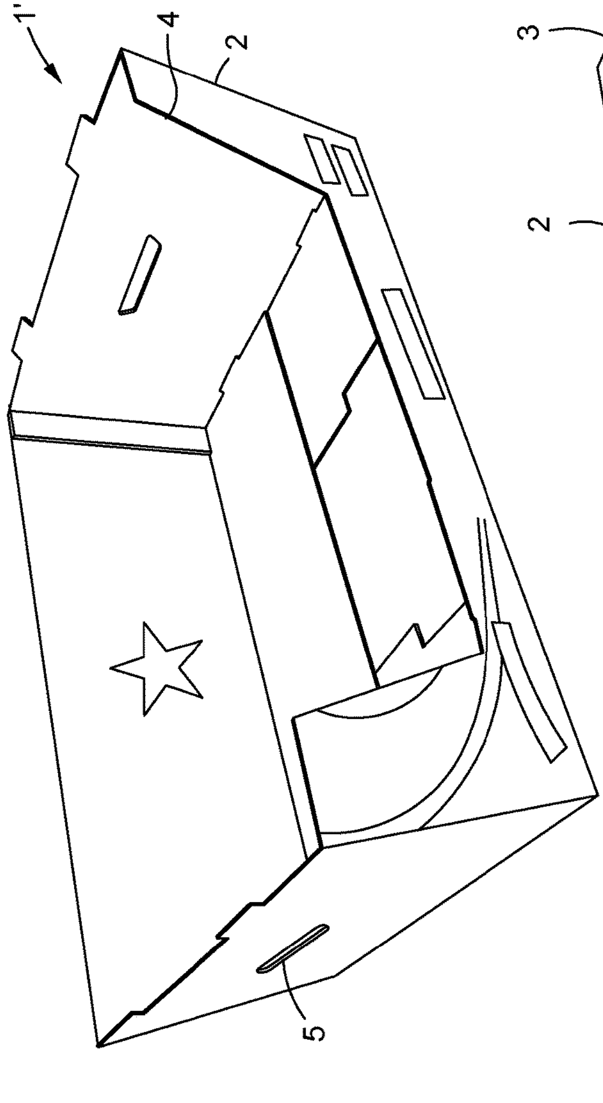

Now referring to FIGS. 1*a* and 1*b*, which illustrate an example of a flat-packed box 1" and a box 1' obtained from the flat-packed box 1" after folding. As seen in the figures, the flat-packed box 1' comprises creased edges 2 which enable folding, cut exterior edges 4 which provide the overall shape to the box 1', and may further comprise cut-outs 5 (e.g., for handles). The flat-packed box 1" is obtained from a sheet substrate 1, such as the one illustrated in FIG. 1*c*. The sheet substrate 1 is a square or rectangular sheet of cardboard or paperboard.

Figure 2:
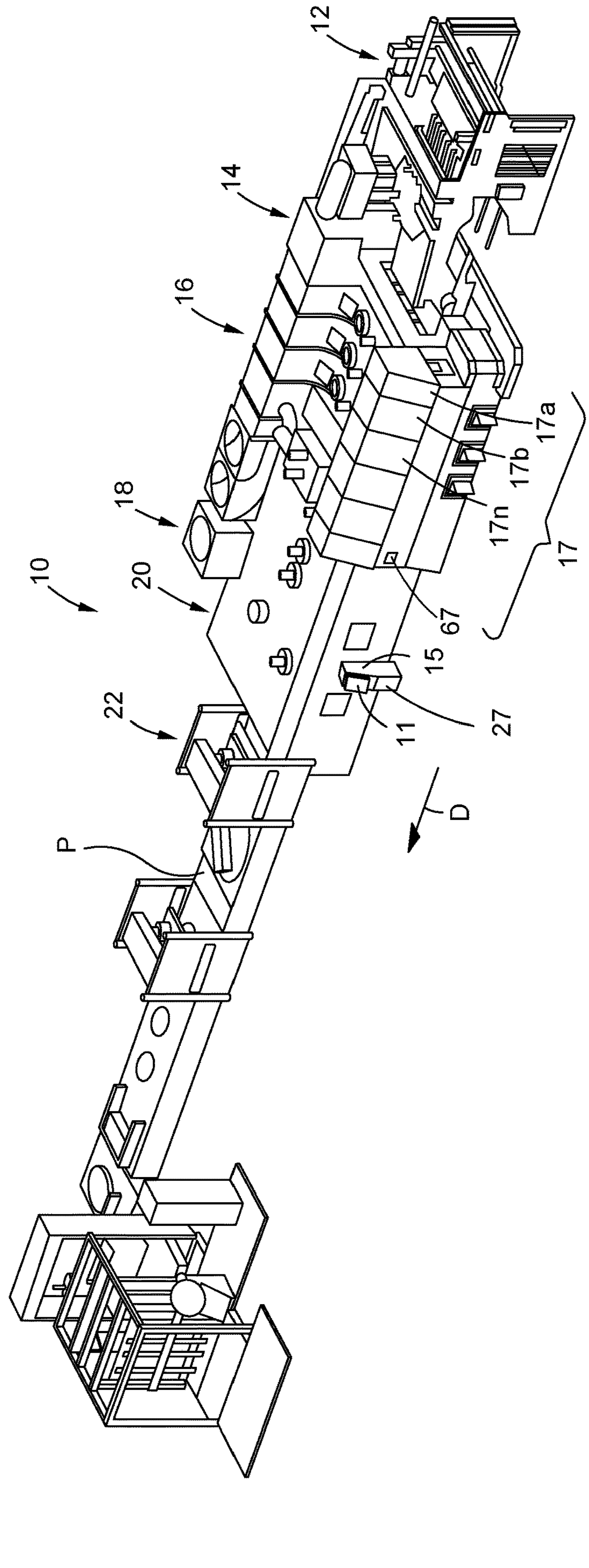
FIG. 2 shows an example of a converting machine in the configuration of a rotary die-cutting machine.

The flat-packed box 1" of FIG. 1*b* is produced in a converting machine 10, as the one illustrated in FIG. 2. At an entry position of the converting machine 10, an unprocessed paperboard or cardboard sheet substrate 1 is placed in a feeder module 14 and is transported in a direction of conveyance D in order to undergo a series of operations which print, cut and crease the sheet substrate 1.

The converting machine 10 illustrated in FIG. 2 is in the configuration of a rotary die-cutter machine. However, in another non-illustrated embodiment the converting machine 10 may be in the configuration of a flexo-folder-gluer machine. The converting machine 10 of FIG. 2 comprises a plurality of different modules or workstations which provide different processing steps to the sheet substrate 1, as it is being conveyed through the converting machine 10.

From the inlet of the converting machine 10 and in a downstream direction along the direction of conveyance D, the converting machine 10 may comprise a pre-feeder 12, a feeder module 14, a flexographic printing module 16 comprising at least one flexographic printing unit 17, a die-cutter module 18, a bundle stacker 20 and palletizer-breaker module 22. A main operator interface 11 may also be provided in the proximity of the converting machine 10.

Before the palletizer and breaker module 22, the sheet substrate 1 may be in the form of an intermediate blank provided with a plurality of side by-side arranged flat-packed boxes 1". FIG. 1*b* illustrates the shape of an intermediate blank obtained before the palletizer-breaker module 22. A plurality of crease lines 2 and cut lines 4 are provided on the surface of the intermediate blank. In order to separate a first blank from a second blank, perforation lines 3 may be provided and can be ruptured in the palletizer-breaker module 22.

Paper or cardboard substrates in the form of sheets 1 are introduced into the converting machine 10 by the feeder 14, which feeds the sheets 1 one by one at a predefined spacing into the converting machine 10. To enable a continuous supply of sheets 1, a stack of sheets is placed in the feeder 14.

A flexographic printing module 16 may be arranged after the feeder module 14 and is configured to print on one side of the sheet 1. Typically, and in converting machines presently on the market, the sheet 1 is printed on the side which will make the outside of the box.

Figure 3:
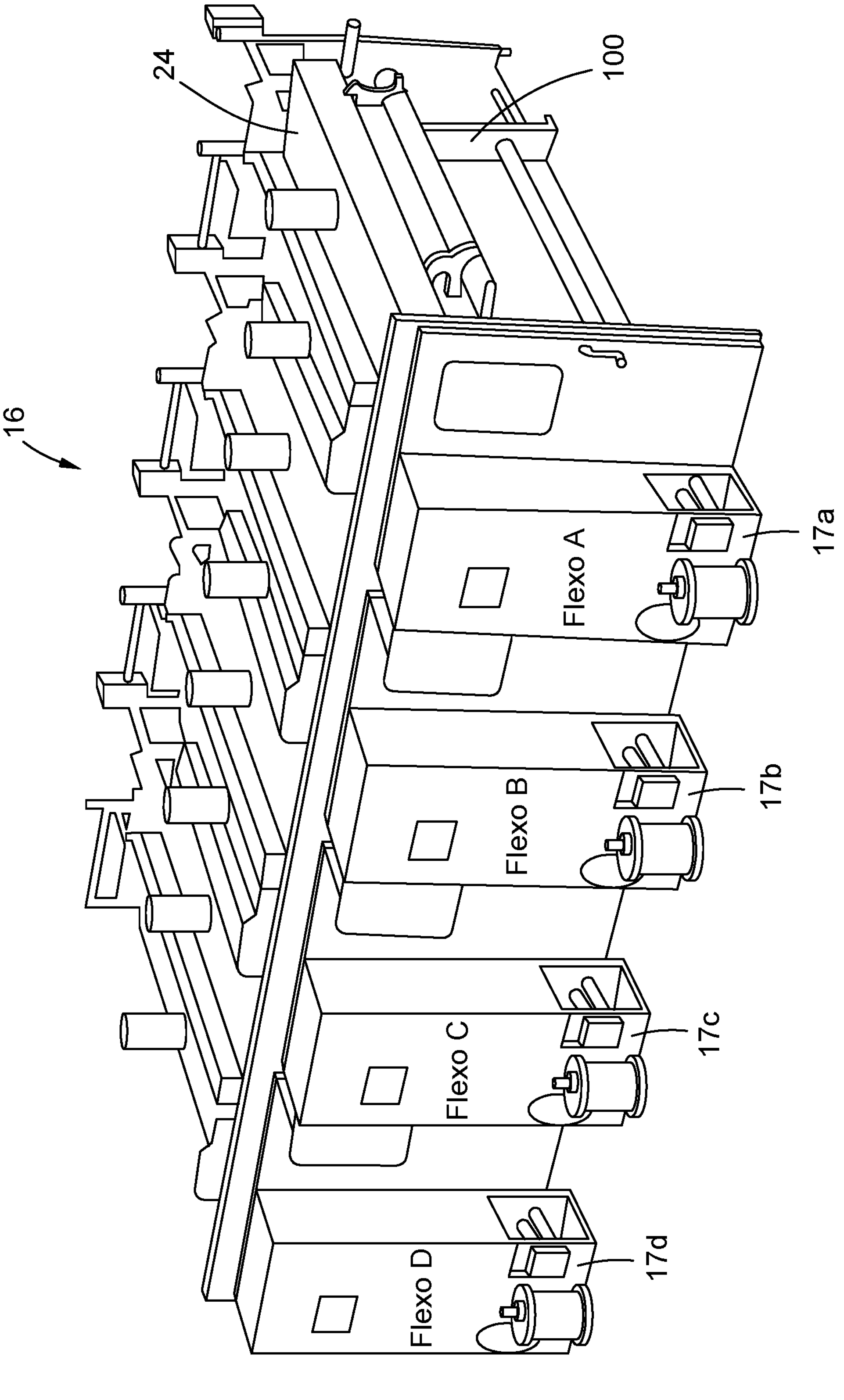
FIG. 3 shows a schematic perspective view of a flexographic printing module.

As best seen in FIG. 3, the flexographic printing module 16 may comprise at least one flexographic printing unit 17. Preferably, the flexographic printing module 16 comprises a plurality of flexographic printing units 17*a*, 17*b* to 17*n*, such as to enable printing with different colors. For instance, the flexographic printing unit 17 may use custom-made inks or use the CMYK color model to achieve color printing with cyan, magenta, yellow, and key (black) ink. The flexographic printing unit 17 comprises an external housing 24 and a structural frame 100, onto which a flexographic printing assembly 28 (as illustrated in FIG. 4) is mounted.

Figure 4:
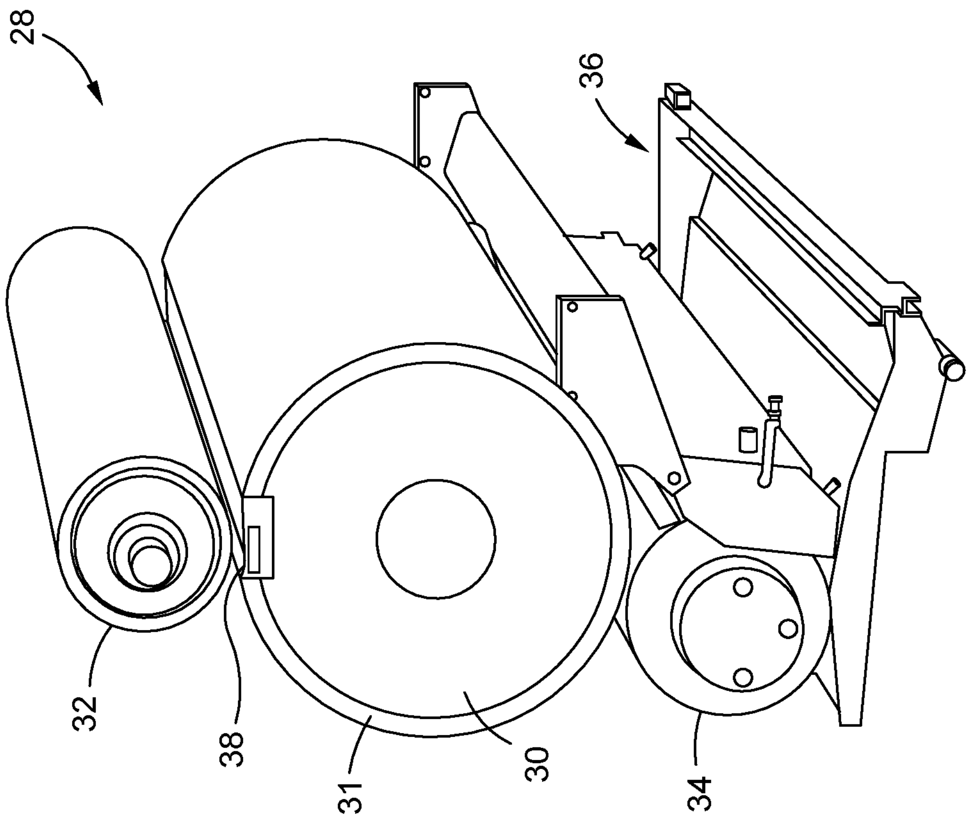
FIG. 4 illustrates a schematic perspective view of a flexographic printing assembly.

An exemplary bottom-printing flexographic printing assembly 28 for a flexographic printing unit 17 as known in the art is illustrated in FIG. 4. The flexographic printing assembly 28 comprises a printing cylinder 30 having an attachment bracket 38 onto which a printing plate 31 can be mounted. The printing plate 31 is provided with a printing die which has been configured for printing a specific motif on the sheet 1. An anilox cylinder 34 is arranged in the proximity of the printing cylinder 30 and is configured to adsorb and transfer ink from a liquid supply device (such as a doctor blade chamber 36) to the printing plate 31.

An anvil 32 (also referred to as counter-cylinder) is arranged next to the printing cylinder 30 and is configured to back/press the sheet 1 against the printing cylinder 30 and to ensure that the motif is being transferred onto the sheet 1.

Figure 5:
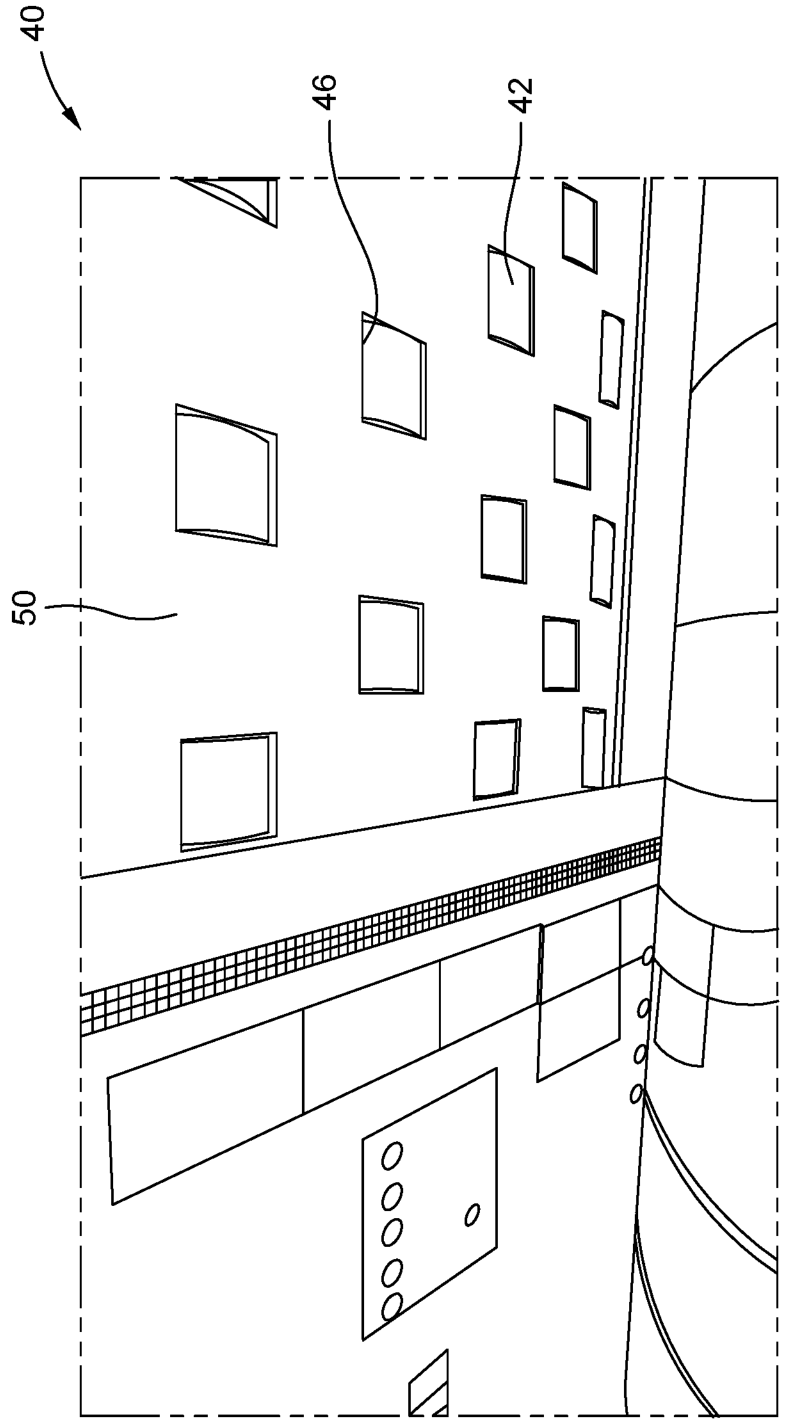
FIG. 5 shows a schematic view of an embodiment of a vacuum transfer.

As best seen in FIGS. 2 and 5, the converting machine 10 further comprises a conveying system configured to transport the sheet 1 along a transportation path P through the converting machine 10 in the direction of conveyance D. The direction of conveyance D is defined from the inlet to the outlet of the converting machine 10. Hence, the transportation path P may extend from the feeder module 14 towards the die-cutter module 18 and further to a delivery table. The conveying system comprises drive elements such as endless belt conveyors and rollers to convey the sheet 1 through the converting machine 10. The conveying system may comprise a plurality separate transportation segments, which are referred to as transfers 40. In particular, the transfers 40 comprise a series of transfer units 66, 68 located in the flexographic printing units 17, 17'. The transfer units 66, 68 may be in the form of vacuum transfer units 66, 68. The conveying system further comprises vacuum transfer units arranged in-between different workstations.

The transfers 40 comprise drive elements 42, such as drive rollers 42 and a plurality of suction apertures 46 provided around the drive rollers 42. The suction apertures 46 are configured to hold the sheet 1 firmly against the drive rollers 42. Alternatively, instead of drive rollers 42, conveyor belts can be used.

The transfers 40 further comprise a transportation surface 50, which may be a smooth metallic surface. The drive rollers 42 are located on the side opposite to the side of the printing cylinder 30. This enables the drive rollers 42 to transport the sheet 1 on the "dry side", which is thus opposite of the side that is currently being printed by the printing plate 31. Consequently, when the sheet 1 is to be printed on both a bottom side S2 and a top side S1, the side of conveyance of the sheet 1 needs to be changed in the converting machine 10.

Figure 6:
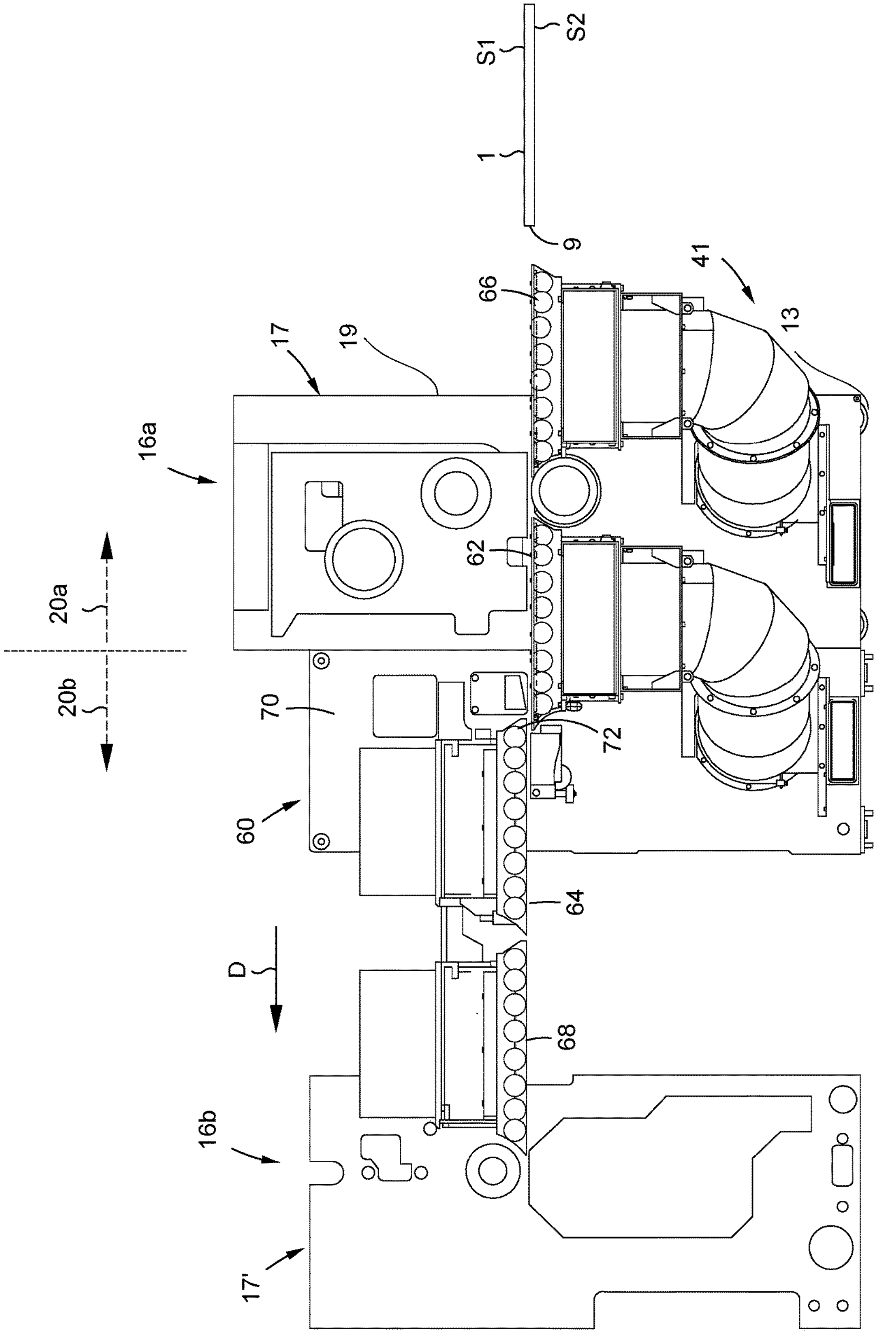
FIG. 6 is a schematic cross-sectional view of an inversion transfer module according to an embodiment of the present invention.

Now referring to FIG. 6, which shows a cross-sectional view of a printing module 16 according to an embodiment of the present invention. As illustrated, the printing module 16 may be in the form of a flexographic printing module 16.

The flexographic printing module 16 comprises a first flexographic printing section 16*a* and a second flexographic printing section 16*b*.

The first flexographic printing section 16*a* comprises at least one flexographic printing unit 17 in the configuration of a top printing arrangement. The second flexographic printing section 16*b* comprises at least one flexographic printing unit 17' in the configuration of a bottom printing arrangement.

The first flexographic printing section 16*a* is thus configured to print on an upper side S1 of the sheet 1 and the second flexographic printing section 16*b* configured to print on a bottom side S2 of the sheet 1. The upper side S1 may in this case represent the inside of the box and the bottom side S2 of the sheet may represent the outside of the box.

The first flexographic printing section 16*a* may comprise one or a plurality of flexographic printing units 17, for instance four 17*a*, 17*b*, 17*c*, 17*d* to enable the use of different inks. Similarly, the second flexographic printing section 16*b* may also comprise one or a plurality of flexographic printing units 17'.

An inversion transfer module 60 is arranged between the last flexographic printing unit 17 of the first flexographic printing section 16*a* and the first flexographic printing unit 17' of the second flexographic printing section 16*b*.

For double-sided printing, the conveying system comprises a first group of transfers 40 configured to contact and transport the sheet 1 on a top side S1 of the sheet 1 and a second group of transfers 40 configured to transport the sheet 1 on a bottom side S2 of the sheet 1. The flexographic printing module 16 comprises both these two groups of transfers 40 in order to transport the sheet 1 on the side opposite of the side that is being printed. To this effect, the first group of transfers comprises a first transfer unit 66 in a first flexographic printing unit 17, and is configured to contact and transport the sheet 1 on the bottom side S2 of the sheet 1. Similarly, the second flexographic printing unit 17' comprises a second transfer unit 68 configured to transport the sheet 1 on the top side S1 of the sheet 1. The transfer units 66, 68 are typically vacuum transfer units and are configured to make the sheet 1 adhere to the drive rollers 42.

Even if the present invention is described and illustrated with a top printing unit 17 arranged before a bottom printing unit 17', it is also possible to configure the converting machine 10 with the bottom printing unit 17' arranged before the top printing unit 17 in the direction of conveyance D. In such a case, the illustrated inversion transfer module 60 is arranged in a reversed/mirrored way.

However, to arrange a top printing section 16*a* before a bottom printing section 16*b* may provide a better precision at the die-cutting module 18. As the sheet 1 is adhered and conveyed on its top surface S1 when it arrives at the die-cutting module 18, it can also be positioned closer to a top-mounted rotary die-cutting tool. This may provide a better transfer and a more accurate position of the sheet 1 at the die-cutting module 18.

Alternatively, in a non-illustrated embodiment, the printing module 16 may be in the form of an offset printing module. The offset printing module may have a first printing unit configured to print on the top side S1 of the sheet 1 and a second printing unit configured to print on a bottom side S2 of the sheet 1.

In another embodiment, the printing module 16 may comprise a first printing unit in the form of an inkjet printing unit configured to print on a top side S1 of the sheet 1 and a flexographic printing unit configured to print on a bottom side S2 of the sheet 1.

The inversion transfer module 60 comprises a bottom inversion vacuum transfer 62 configured to contact the bottom side S2 of the sheet 1 and a top inversion vacuum transfer 64 configured to contact the top side S1 of the sheet 1. The bottom inversion vacuum transfer 62 and the top inversion vacuum transfer 64 of the inversion transfer module 60 enable a change of the side of conveyance of the sheet 1. The inversion transfer module 60 thus changes the side of adherence of the sheet 1 from an upstream-located transfer unit 66 of the first printing section 16*a* to a downstream-located transfer 68 of the second printing section 16*b*. In the illustrated embodiment, the bottom inversion vacuum transfer 62 is configured as an inlet vacuum transfer and the top inversion vacuum transfer 64 is configured as an outlet vacuum transfer in the direction of conveyance D.

Figure 7B:
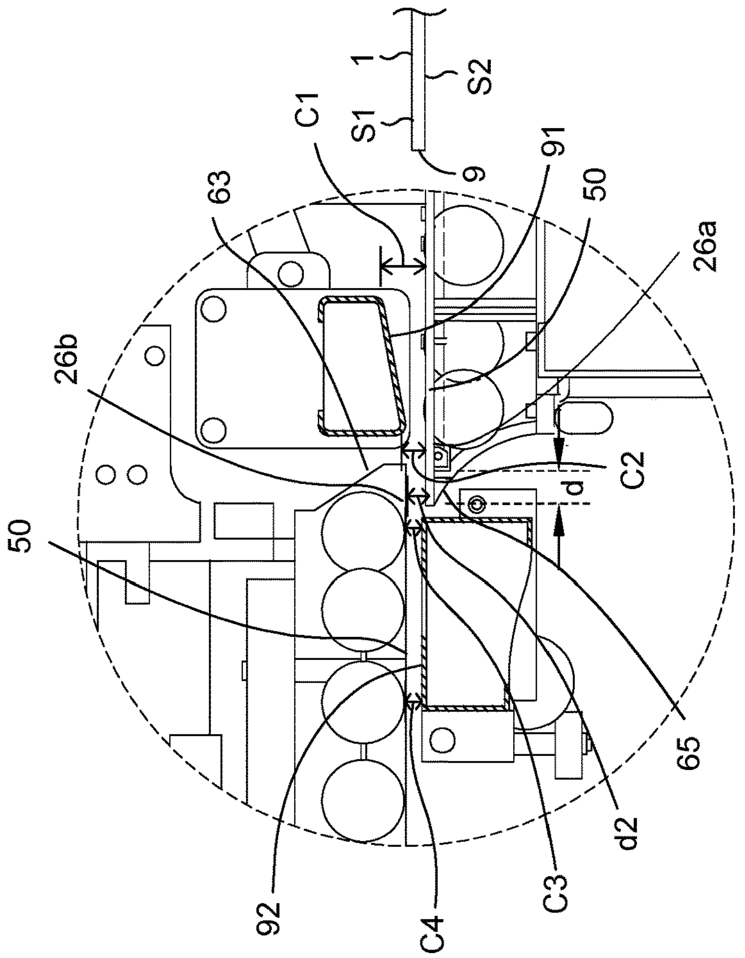
FIG. 7*b* is a detailed view of the transition between a bottom inversion vacuum transfer and a top vacuum inversion transfer.
Figure 7A:
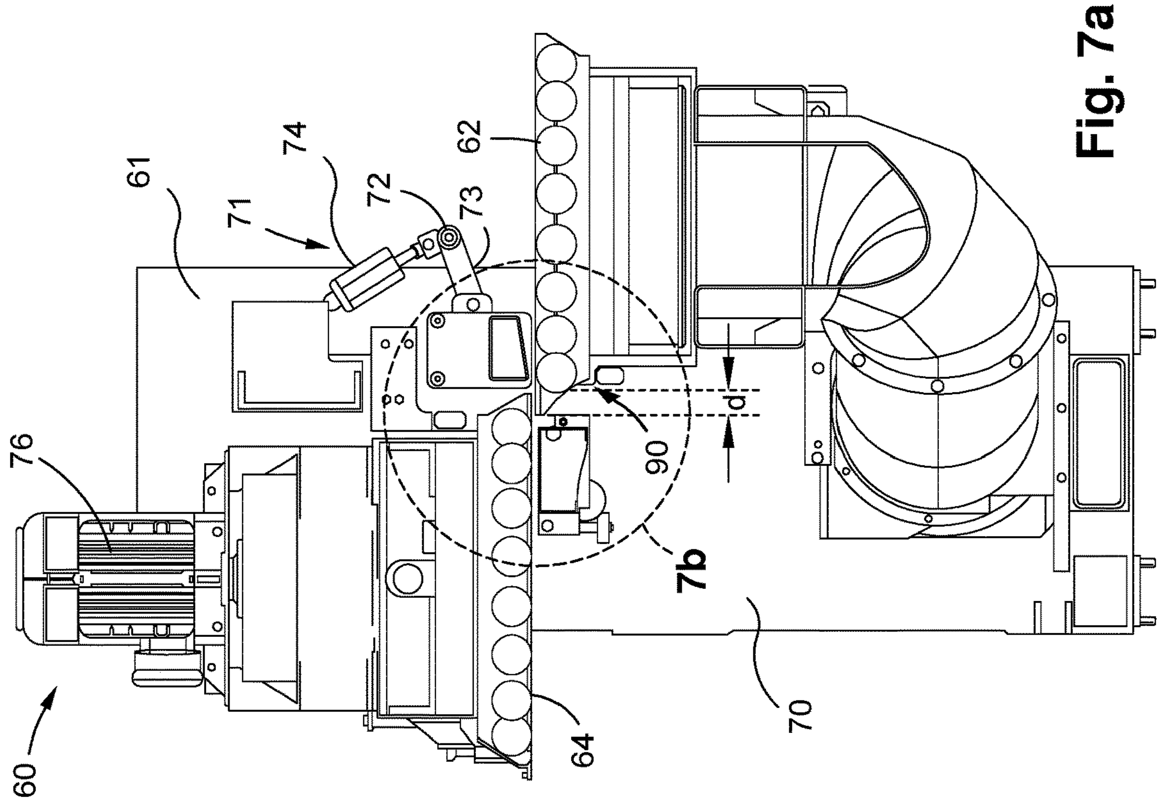
FIG. 7*a* is a detailed cross-sectional view of an inversion transfer module according to an embodiment of the present invention.
Figure 8B:
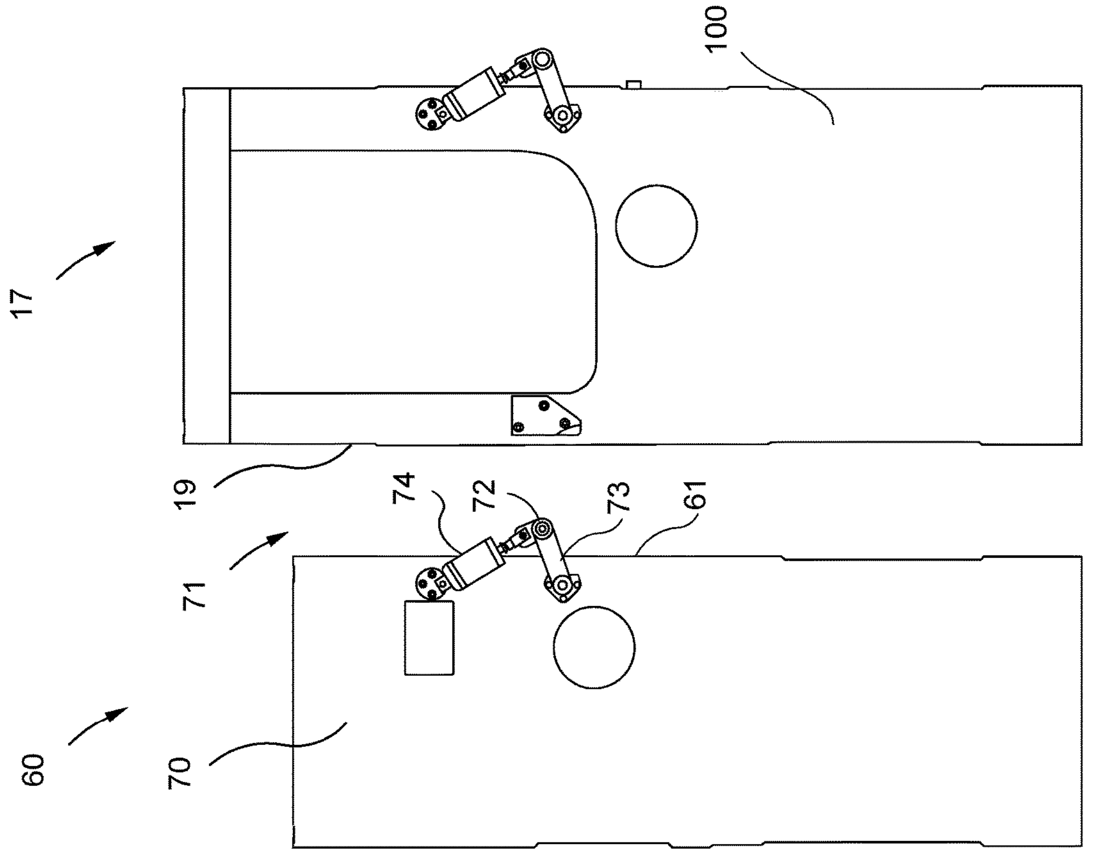
FIGS. 8*a* and 8*b* illustrate a schematic cross-sectional view of a locking arrangement between the inversion transfer module and a flexographic printing unit.
Figure 8A:
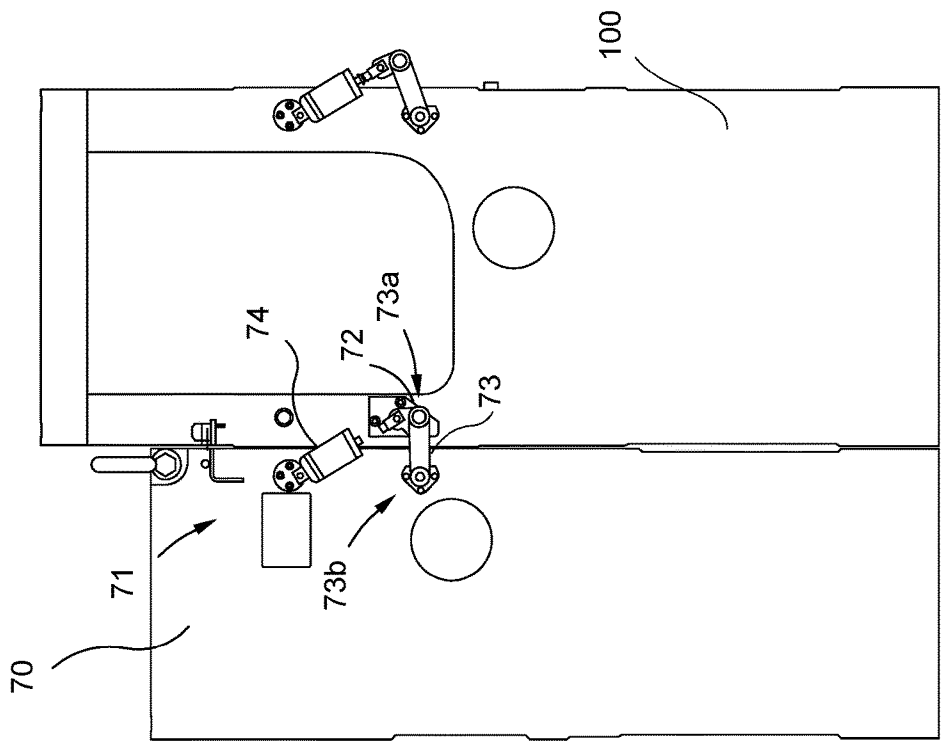
Figure 9:
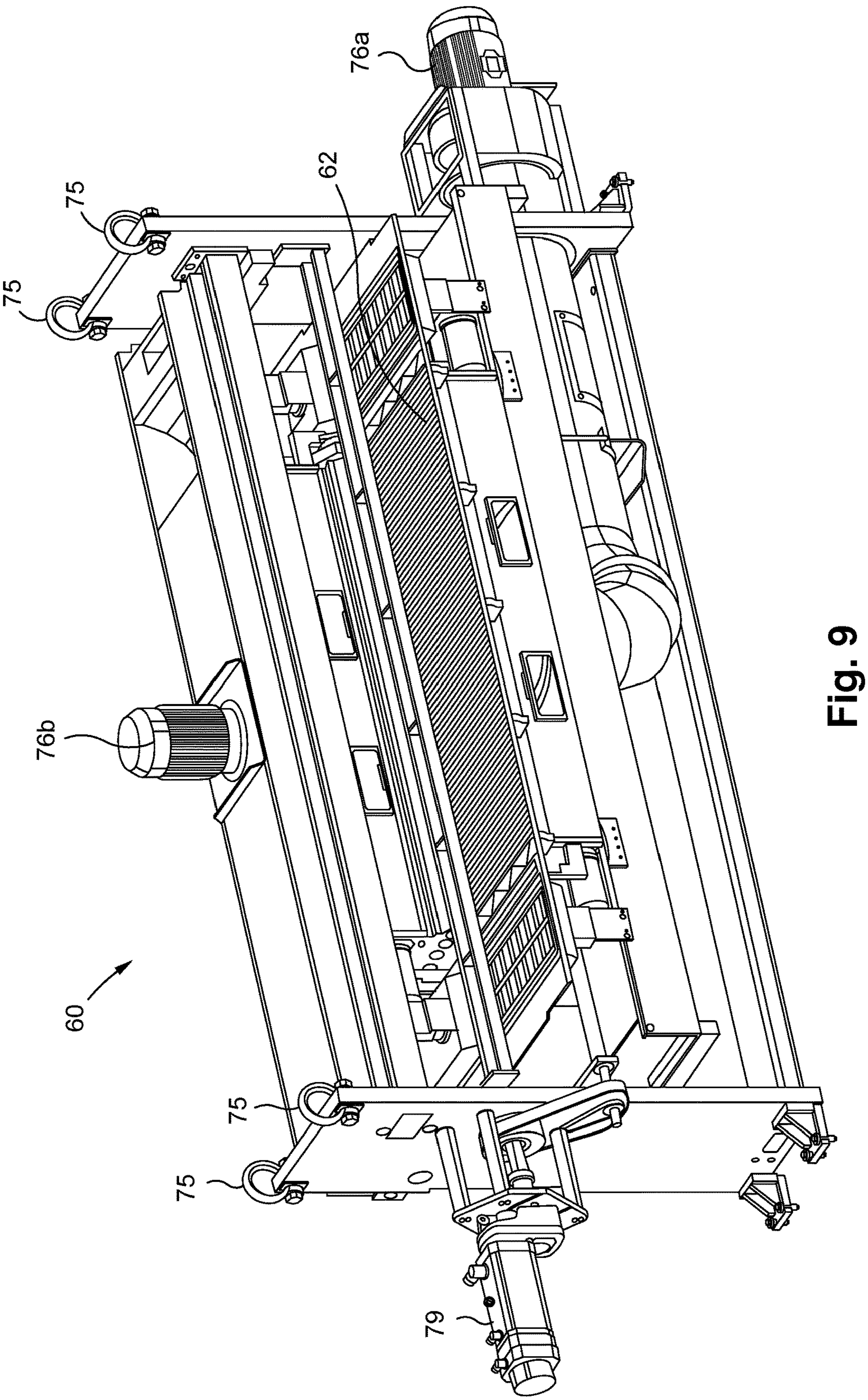
FIG. 9 is a schematic perspective view of the inversion transfer module of FIG. 7*a* from an inlet side.

As illustrated in FIGS. 7*a* and 7*b*, the inlet inversion vacuum transfer 62 and the outlet inversion vacuum transfer 64 are mounted on a structural frame 70. The vertical distance d2 between inlet inversion vacuum transfer 62 and outlet inversion vacuum transfer 64 in the inversion transfer module 60 is selected such that a typical maximum thickness of a sheet 1 can pass through the clearance between the inlet inversion vacuum transfer 62 and the outlet inversion vacuum transfer 64. Typically, the distance d2 of this clearance may be about 10 mm, which corresponds to a common maximum cardboard thickness.

As illustrated in FIGS. 7*a*, 7*b*, 8*a* and 8*b*, the inversion transfer module 60 may further comprise at least one locking mechanism 71 for mechanically connecting the inversion transfer module 60 to the closest upstream-located flexographic printing unit 17. The locking mechanism 71 comprises a movable locking part 72 attached to a lever 73 and a piston actuator 74. The locking part 72 is positioned on a first extremity 73*a* of the lever 73, while the second extremity of the lever 73*b* is fixedly but rotatably mounted in the housing 61 of the inversion transfer module 60 and defines a rotation axis A of the lever 73. The piston actuator 74 is connected to the first extremity 73*a* of the lever 73. The piston actuator 74 can be actuated such that the locking part 72 arranged on the first extremity 73*a* is moved in a circular path and in the vertical direction. The structural frame 100 of the printing unit 17 comprises a corresponding mating geometry to the locking part 72 such that a lock between the inversion transfer module 60 and the structural frame 100 of the printing unit 17 can be achieved.

The piston-actuated lever 73 thus enables the structural frames 70, 100 or the housings 61, 19 of the inversion transfer module 60 and the printing unit 17 to be forced into contact against each other. Hence, the piston actuator 74 can be actuated until a stop has been sensed and thus indicating that the housings 61, 19 are in contact with each other.

In order to achieve a uniform connection, the inversion transfer module 60 may comprise two locking mechanisms 71 located on each of the lateral sides of the inversion transfer module 60.

In a non-illustrated embodiment, a similar locking mechanism 71 can be located on the downstream side of the inversion transfer module 60 and actuated in order to lock the inversion transfer module 60 to the closest downstream-located flexographic printing unit 17' of the second flexographic printing section 16*b*. This locking mechanism can advantageously be used if the closest flexographic printing unit 17' located downstream of the inversion transfer module 60 is mobile (i.e., displaceable on a floor).

The locking mechanism 71 makes it possible to uncouple the inversion transfer module 60 from the flexographic printing unit 17, 17'. If the flexographic printing unit 17, 17 is mobile (i.e., displaceable on a floor), it can be moved after the uncoupling (in the direction of conveyance D) away from the inversion transfer module 60 or from an adjacent flexographic printing unit 17. If the inversion transfer module 60 is mobile, it may also be displaced. Such an operation can be needed in order to gain access to the printing plate 31 on the flexographic printing cylinder 30, or for a general service intervention.

As seen in FIG. 6, the converting machine 10 may comprise a mobile part 20*a* and a fixed part 20*b*, and the inversion transfer module 60 can be arranged as a transition element between the mobile part 20*a* and the fixed part 20*b*. The mobile part 20*a* can be configured to include the modules from the feeder 14 to the last flexographic printing unit 17 in the first flexographic printing section 16*a*. The fixed part 20*b* can be configured to include the inversion transfer module 60 and the flexographic printing units 17' in the second flexographic printing section 16*b*. The modules of the mobile part 20*a* may have rollers or wheels 13 for displacement on a floor. Alternatively, instead of wheels, the modules in the mobile part 20*a* may be slidably mounted on the floor by a slide rail connection. Optionally, the inversion transfer module 60 may be provided with wheels 13 for displacement on a floor.

The inlet inversion vacuum transfer 62 and the outlet inversion vacuum transfer 64 are connected to at least one vacuum source 76*a*, 76*b* via vacuum ducts 33. In the illustrated embodiment, the inlet inversion vacuum transfer 62 may be connected to a first vacuum generator 76*a* and the outlet inversion vacuum transfer 64 may be connected to a second vacuum generator 76*b*. Alternatively, a single vacuum generator and at least one valve can be used in order to distribute and modulate the vacuum suction force between the inlet and outlet inversion vacuum transfers 62, 64.

The vacuum generators 76*a*, 76*b* can be configured to provide a variable vacuum force. In particular, the converting machine 10 may be configured to receive different settings such that the vacuum force and the area of the vacuum force can be modified. The settings can be modified depending on the dimensions (i.e. sheet area), weight and surface quality of the sheets 1. As regards to the surface quality, typically a smooth surface will adhere stronger to the vacuum apertures 46 than a rugged surface. The vacuum generators 76*a*, 76*b* or generator 76 may provide the variable vacuum force in response to a variable rpm setting.

Figure 10:
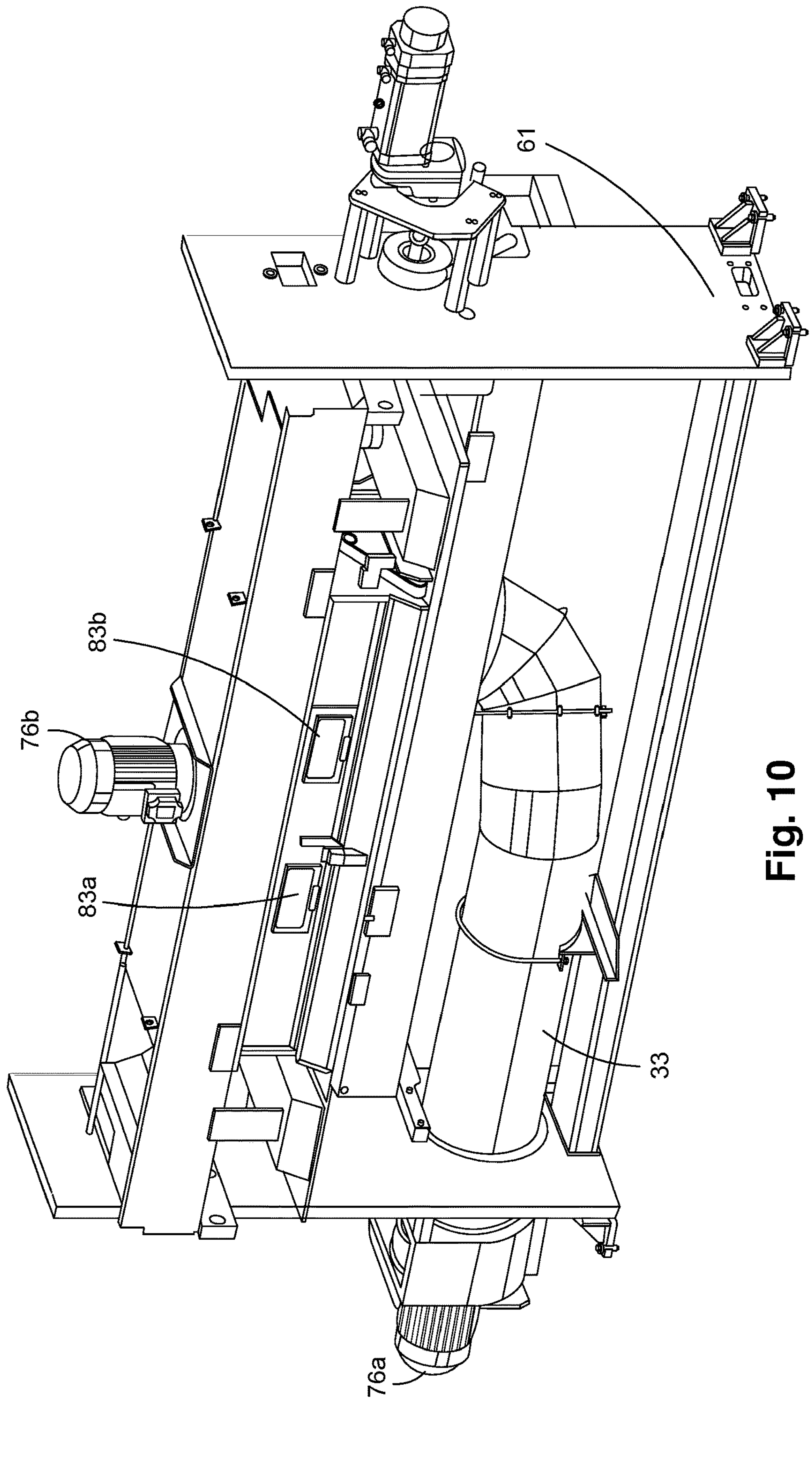
FIG. 10 is a schematic perspective view of the inversion transfer module from an outlet side.
Figure 11:
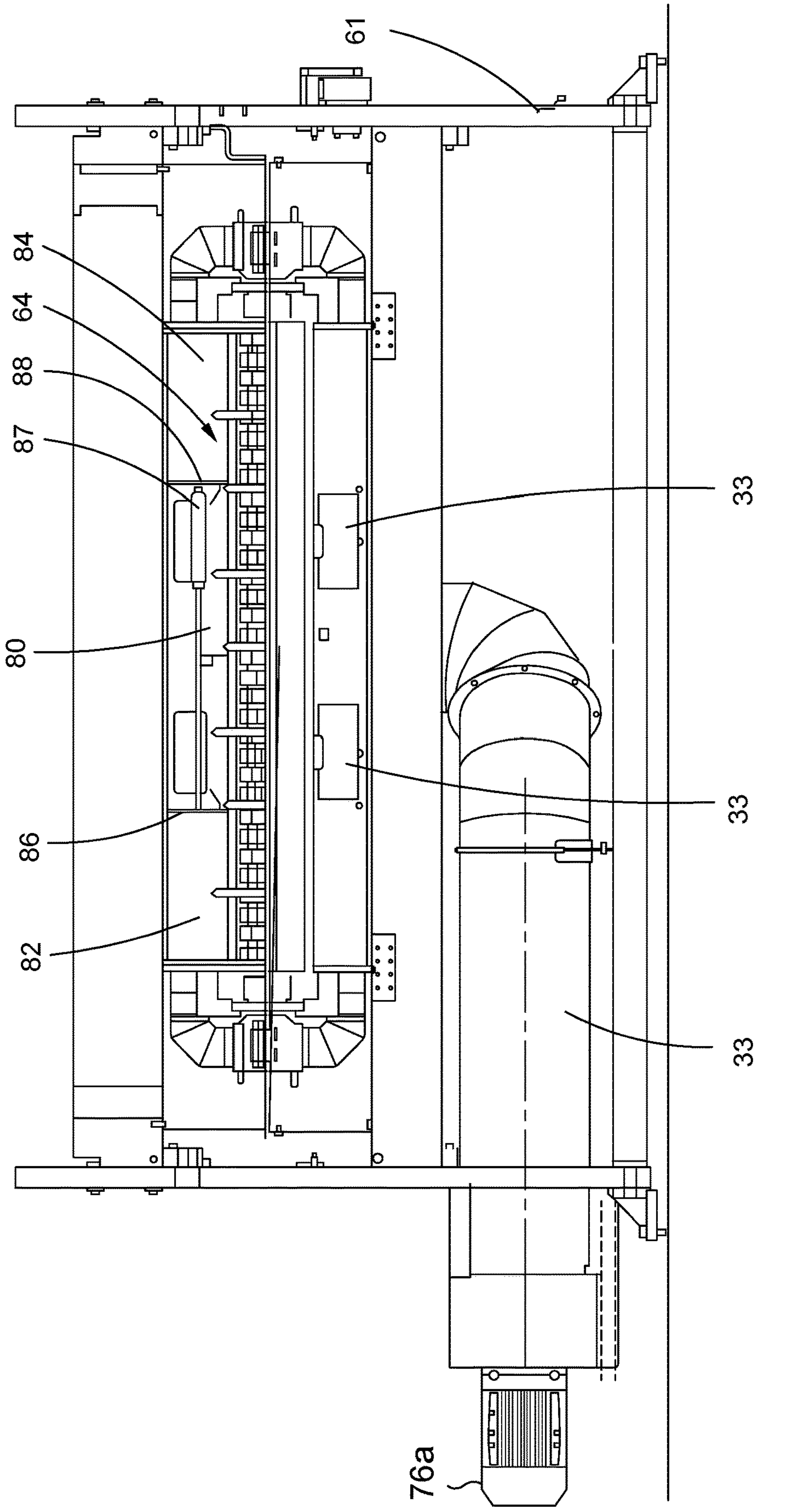
FIG. 11 is a schematic cross-sectional view of the inversion transfer module of FIGS. 9 and 10.

As best seen in FIGS. 10 and 11, a housing 61 of an upper inversion vacuum transfer 64 may comprise separate suction compartments 80, 82, 84 which are connected to a vacuum generator 76*b*. Internal walls 86, 88 extending in the direction of conveyance D are arranged such that a centrally arranged suction compartment 80 is provided, and arranged in-between a first lateral suction compartment 82 and a second lateral suction compartment 84.

The central suction compartment 80 is provided with separation walls 86, 88 against the first and second lateral suction compartments 82, 84. The separation walls 86, 88 are provided as movable shutters 86, 88 and configured to provide a variable degree of opening. The shutters 86, 88 may be pivotably movable.

The shutters 86, 88 control the location of the suction force. The central suction compartment 80 may be directly connected to the vacuum generator 76*b*. In order to distribute the negative pressure to the first and second lateral suction compartments 82, 84, the shutters 86, 88 are opened. Hence, vacuum is created in the lateral suction compartments 82 and 84 when opening the shutters 86, 88 of the central suction compartment 80.

The shutters 86, 88 enable the pressure inside the suction compartments 80, 82, 84 to be selectively modulated. When the shutters 86, 88 are closed, the suction force is concentrated to the central suction compartment 80. When the shutters 86, 88 are opened, the suction force is distributed to the lateral suction compartments 82, 84 via the central suction compartment 80.

When opening the shutters 86, 88, a pressure drop is achieved while the suction force is distributed over a larger area. For small-width sheets 1 (e.g. unfolded blanks with a width inferior to 1 meter), the suction force is preferably concentrated to the central suction compartment 80. Hence, the suction force is larger in the central suction compartment 80 than in the lateral suction compartments 86, 88. Small-width sheets 1 are obstructing fewer suction apertures than large-width sheets and thus require a higher suction force. The vacuum adherence is increased as a function of an increasing number of obstructed suction apertures. By closing the shutters 86, 88 and concentrating the vacuum suction force to the central compartment 80, a small-width sheet 1 can be better adhered to the upper inversion vacuum transfer 64. For larger widths, the suction force is applied over a larger width of the sheet 1.

The degree of opening of the shutters 86, 88 can be automatically adjusted by an actuator 87 and controlled from a peripheral control unit 65 or a central control unit 15. For instance, a pneumatic cylinder actuator 87 can be used. The control units 65, 15 can be configured to calculate and determine an optimal degree of opening of the shutters 86, 88 depending on the format and/or the weight of the sheet 1 and optionally the surface quality. The shutters 86, 88 can then be moved with the actuator 87 extending in a transverse direction in relation to the direction of conveyance D.

As illustrated in FIGS. 7*a* and 7*b*, a housing shroud 63 of the top inversion vacuum transfer 64 and housing shroud 65 of the bottom inversion vacuum transfer 62 are preferably overlapping at a distance d. The overlapping distance d ensures a restriction to the position of the sheet 1 when it is being transferred from the inlet inversion vacuum transfer 62 to the outlet inversion vacuum transfer 64. The distance d is selected to avoid a counteraction/interference between lower inversion vacuum transfer 62 and the upper inversion vacuum transfer 64. In the transition between the inlet inversion vacuum transfer 62 and the outlet inversion vacuum transfer 64, the closest adjacent suction opening 26*b* of the outlet inversion transfer 64 is preferably offset in relation to the closest adjacent suction opening 26*a* of the inlet inversion transfer 62. The distance d can thus be selected (i.e., dimensioned) so that in the direction of conveyance D, a first upper suction opening **26*b* of the upper inversion vacuum transfer 64 is offset in relation to the last lower suction opening 26*a* of the lower inversion vacuum transfer 62**.

The inversion transfer module 60 may be configured to change the side of adherence on the sheet 1 when the sheet 1 is not in contact with any printing cylinders 30. To this effect, the inversion transfer module 60 may be provided with an inlet inversion vacuum transfer 62 that is of equal or greater length to the length of the sheet 1. This enables the sheet 1 to only start transitioning to a different side of adherence once the sheet 1 is no longer in contact with the upstream-located printing cylinder 30. Hence, sheets 1 of a certain length will change the side of traction when not in contact with any printing cylinders 30.

However, and in a more common embodiment, the sheets 1 are longer than the length of the inlet inversion vacuum transfer 62, and the change of adherence side will take place while the sheet 1 is still present in the flexographic printing assembly 28 of the upstream-located printing unit 17.

To further control the change of adherence side, the inlet inversion vacuum-transfer 62 can be driven in unison with an adjacent vacuum transfer unit 66 of the closest upstream-located printing unit 17. The speed of the inlet inversion vacuum transfer 62 is equal to the speed of the vacuum transfer unit 66 of the upstream-located flexographic printing unit 17.

Similarly, the outlet inversion vacuum transfer 64 can be driven in unison with the vacuum transfer unit 68 of the closest downstream-located printing unit 17'. This allows for a precise and constant speed of the sheet 1 in the inversion transfer module 60 and the adjacent flexographic printing units 17.

In another embodiment, the inlet inversion vacuum transfer 62 and the outlet inversion vacuum transfer 64 can be connected to the same motor 79 and the speed of the inversion vacuum transfers 62, 64 is equal and is defined by a retrieved overall conveyance speed through the converting machine 10. The overall conveyance speed may be calculated and communicated by the control unit 65 in real-time.

The inversion transfer module 60 may further comprise a guiding arrangement 90 configured to control the movement of the front leading edge 9 of the sheet 1 as it transitions between the inlet inversion vacuum transfer 62 and the outlet inversion vacuum transfer 64.

To this effect, a first deflector 91 is arranged at an angle in relation to the transportation surface 50 of the inlet inversion vacuum transfer 62 and defines an entry clearance C1 and an exit clearance C2 with the inlet inversion vacuum transfer 62. The entry clearance C1 is larger than the exit clearance C2, such that a funnel-shaped entry passage to the outlet vacuum transfer 64 is provided. The first deflector 91 is configured to position the leading sheet edge 9 and to adhere the sheet 1 flat against the inlet inversion transfer 62. The adhering effect is achieved by a gradual concentration and amplification of the vacuum force down in the funnel-shaped entry passage. The first deflector 91 is also configured to position the leading front edge 9 of the sheet 1 so that it passes under the outlet vacuum transfer 64. The funnel-shaped first deflector 91 may also prevent the presence of overlapping sheets 1 by restricting the exit clearance C2, such that only one sheet 1 can pass at a time.

A second horizontally arranged deflector 92 is arranged downstream of the first deflector 91 and defines an entry clearance C3 and an exit clearance C4 with a transportation surface 50 of the outlet inversion vacuum transfer 64. The entry C3 and exit clearances C4 may be equal. The second deflector 92 may be arranged parallel to the outlet inversion vacuum transfer 64.

Hence, the second deflector 92 is configured to restrict the sheet substrate 1 at a desired distance C3, C4 under the upper vacuum transfer 64 such that it is adhered and driven by the outlet inversion transfer 64. This distance C3, C4 ensures that the sheet 1 is lifted and adhered to the upper inversion vacuum transfer 64 in a controlled and restricted manner.

Without the second deflector 92, there may be a risk that the front edge of the sheet 1 does not adhere to the upper inversion vacuum transfer 64 and "dives down". This will result in that the full sheet falls down vertically.

When printing on the top surface S1 of the sheets 1, a flexographic printing assembly 28 needs to be arranged differently from when the printing is effectuated on the bottom side S2 of the sheet 1. The printing cylinder 30 and doctor blade chamber 36 need to be arranged on the top when printing on the top surface S1 of the sheets 1. However, this sometimes makes it difficult to access the printing cylinder 30 to change the printing plate 31.

Figure 12B:
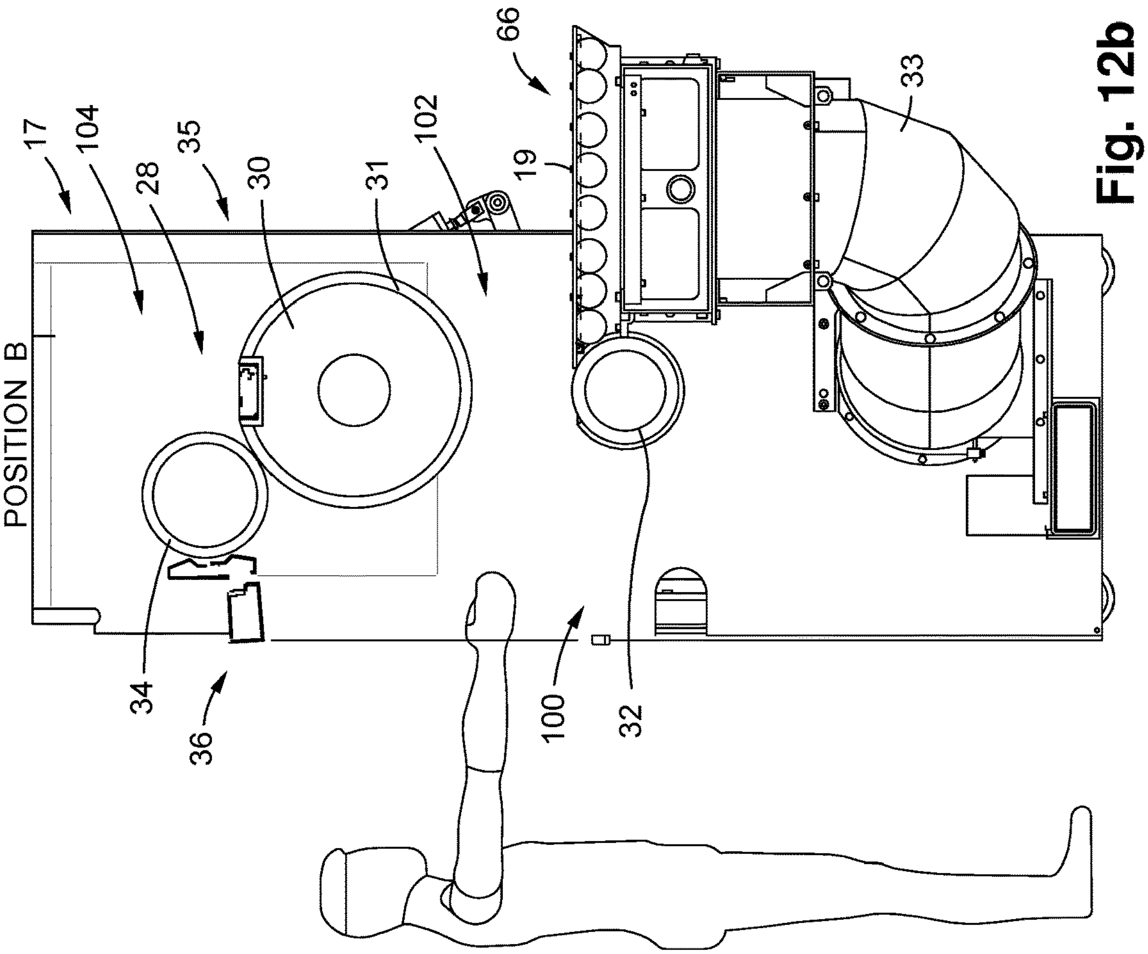
FIGS. 12*a* and 12*b* are schematic cross-sectional views of a flexographic printing unit for top-printing according to an embodiment of the present invention, and in which the printing assembly is in a printing and service position, respectively.
Figure 12A:
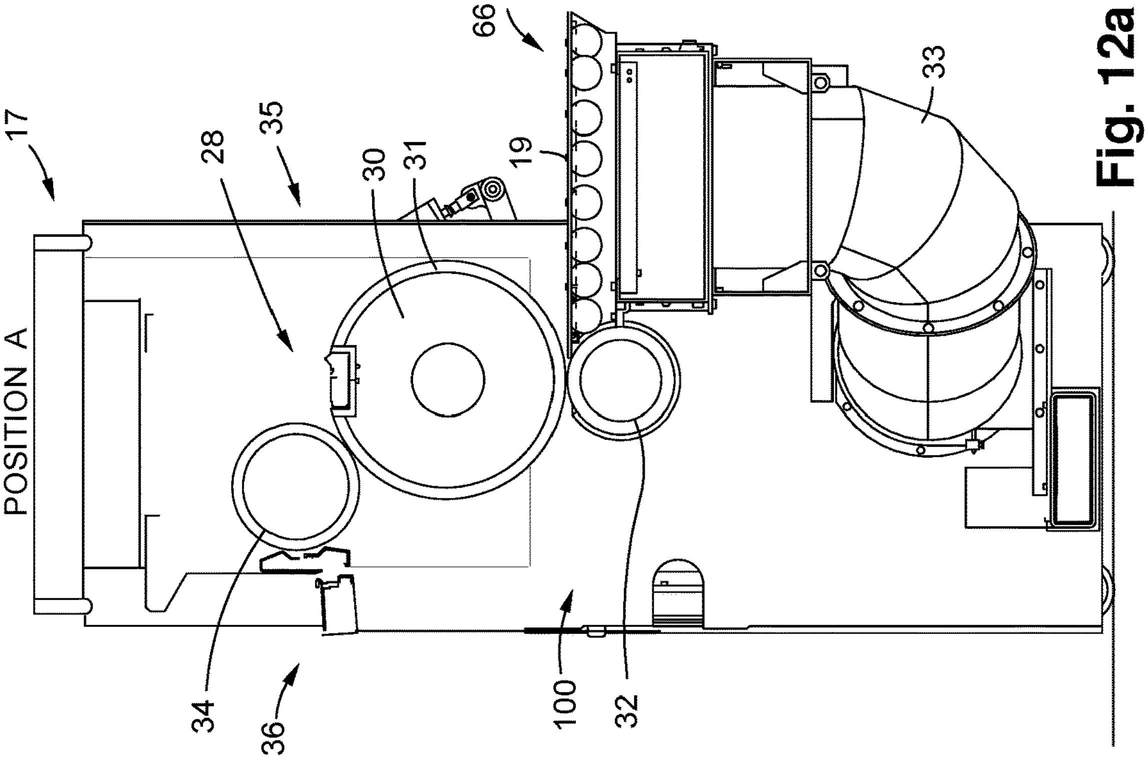

Now referring to FIGS. **12*a* and 12*b*, which illustrate a flexographic printing unit 17 configured to print the sheet substrate 1 on a top side S1 thereof. As illustrated in FIGS. 12*a* and 12*b*, the flexographic printing unit 17 comprises a flexographic printing assembly 28 and a flexographic transfer unit 66 connected to a vacuum duct 33. The flexographic transfer unit 66 may be configured similar to the transfer unit 40 illustrated in FIG. 5, whereby drive elements 42 such as rollers 42 are driving the sheet 1 forward in the direction of conveyance D, while vacuum apertures 46 around the rollers 42 adhere the sheet 1 by aspiration to the drive elements 42 and participates in keeping the sheet 1** flat.

The flexographic printing assembly 28 comprises a printing cylinder 30, a counter-cylinder 32, an anilox cylinder 34 and a doctor blade chamber 36. As the flexographic printing assembly 28 is configured for top printing, the printing cylinder 30 and the doctor blade chamber 36 are located at the upper part of the flexographic printing unit 17, above the counter cylinder 32.

The flexographic printing unit 17 further comprises a structural frame 100, onto which the printing assembly 28 is mounted. As best seen in FIGS. **13*a* and 13*b*, the structural frame 100 comprises a fixed frame portion 102 and a movable frame portion 104. Some components of the flexographic printing assembly 28 are connected to the movable frame portion 104 and are forming a cassette 35, which is vertically movable in relation to the fixed frame component 102**.

Figure 14:
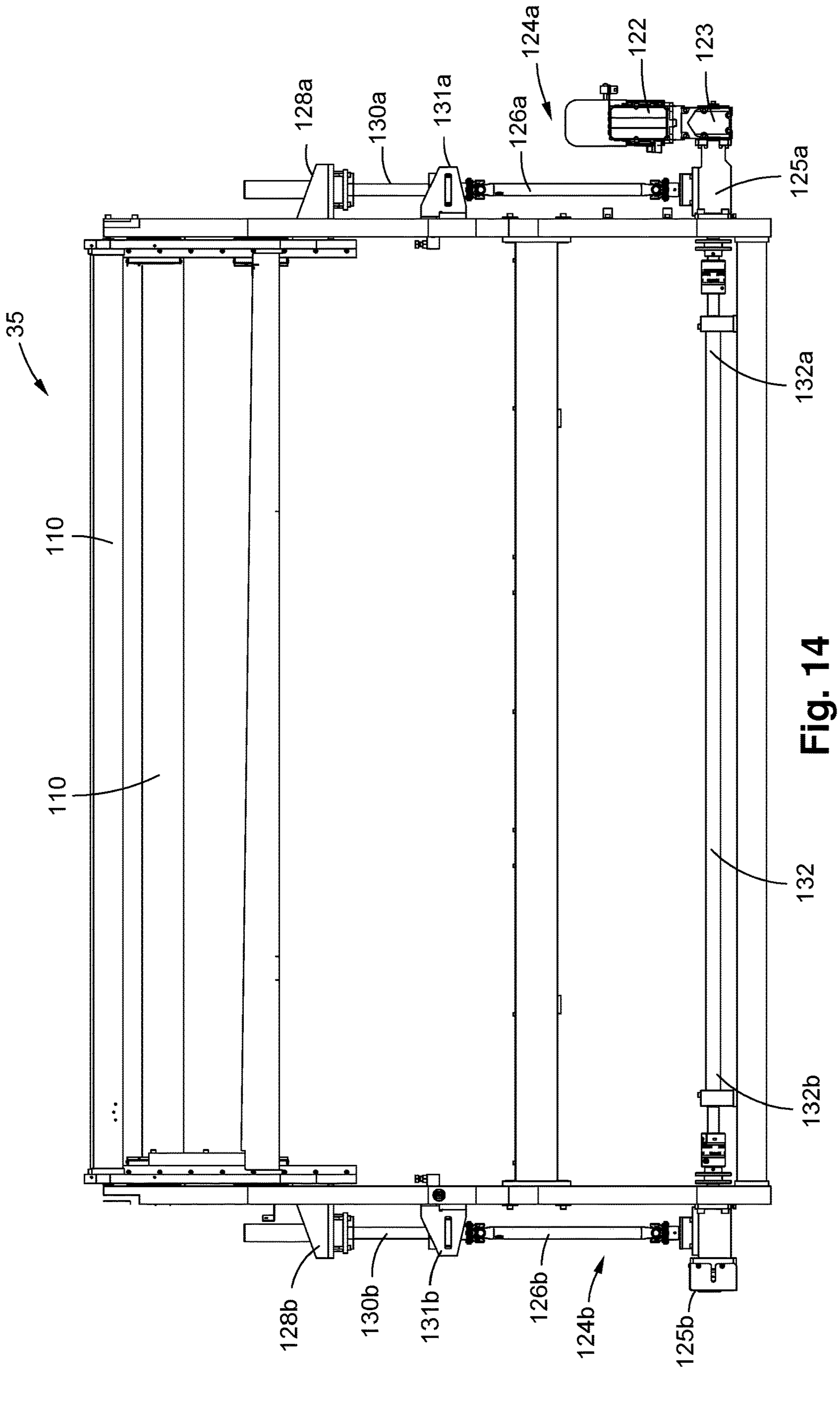
FIG. 14 is a schematic frontal view of the structural frame from FIGS. 12*a* and 12*b*.
Figure 15:
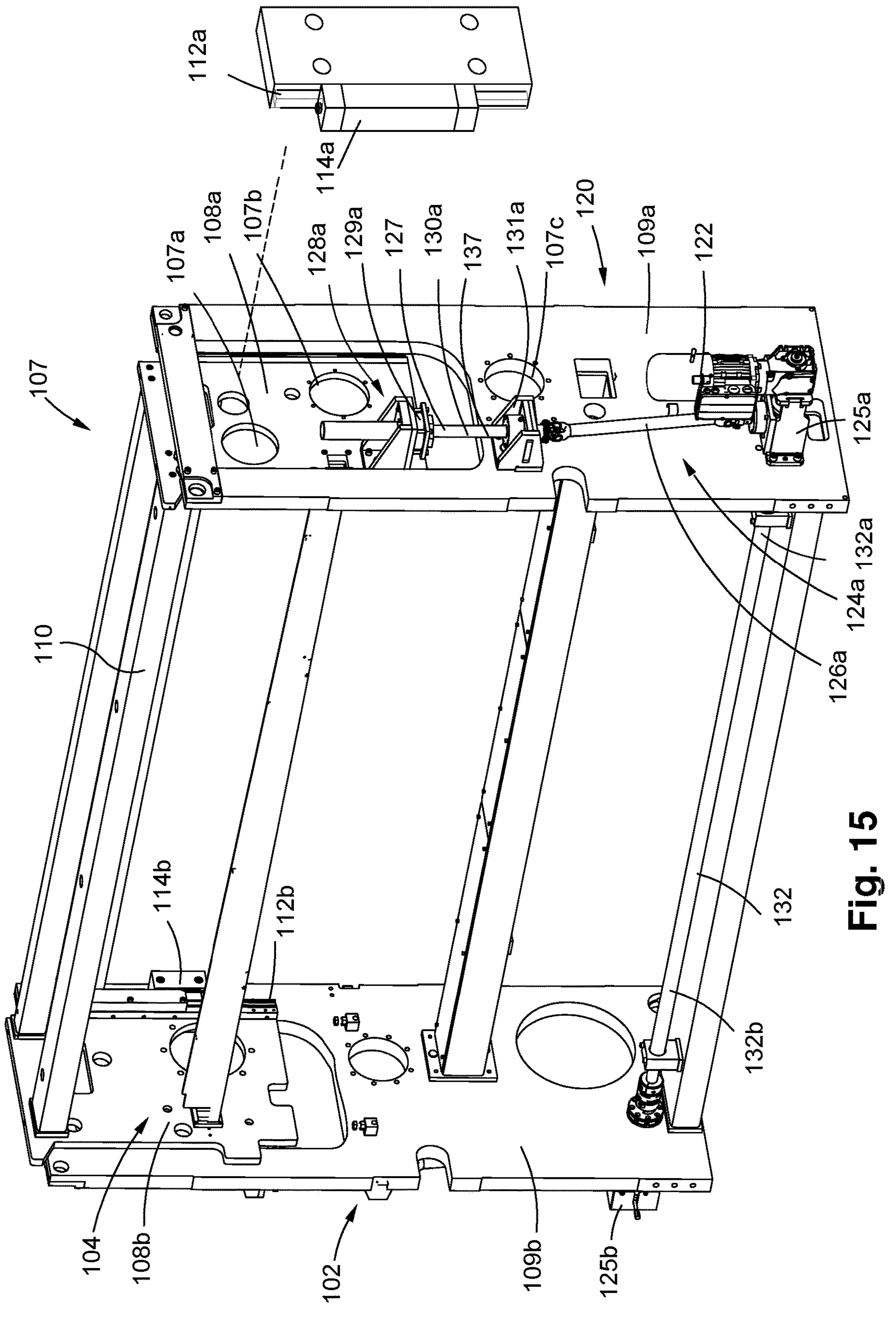
FIG. 15 is a schematic perspective view of the structural frame of FIG. 14.

The movable frame portion 104 comprises a first side bracket **108*a* and a second side bracket 108*b*. As best seen in FIGS. 14 and 15, the first side bracket 108*a* and the second side bracket 108*b* are connected by a plurality of transverse and elongated frame components 110. The transverse frame components 110 stabilize the side brackets 108*a*, 108*b* in order to improve the rigidity of the cassette 35**.

The flexographic printing assembly 28 includes a printing cylinder 30, an anilox cylinder, a counter cylinder 32 and a doctor blade chamber 36. The printing cylinder is arranged vertically above the counter cylinder 32 and configured to print on a top side S1 of a sheet 1. The printing cylinder 30, the anilox cylinder 34 and the doctor blade chamber 36 are attached to the movable frame portion 104 and the counter cylinder 32 is attached to the fixed frame portion 102.

The first side bracket **108*a* and the second side bracket 108*b* comprise openings 107*a*, 107*b*, configured to receive ends of the printing cylinder 30 and anilox cylinder 34. The counter-cylinder 32 is mounted to the fixed frame portion 102, in an opening 107***c*. Intermediate parts, such as rolling bearings can be mounted in the openings and attach to shafts of the printing cylinder 30, counter cylinder 32 and anilox cylinder 34.

The fixed frame 102 portion comprises a first side frame portion 109*a* and second side frame portion 109*b*. The first side bracket 108*a* and the second side bracket 108*b* are slidably connected to the first 109*a* and second side frame portion 109*b*, respectively.

In order to provide a sliding connection, a guide rail 112 and sliding block 114 can be provided between the movable frame portion 104 and the fixed frame portion 102 to form the sliding connection. As illustrated in the FIG. 15, a first and second sliding block 114*a*, 114*b* can be connected to the first and second side brackets 108*a*, 108*b*, respectively. The sliding blocks 114*a*, 114*b* may comprise ball bearings arranged in a line to constitute a contact surface to guide rails 112*a*, 112*b* located on the fixed frame portion 102. A first guide rail 112*a* and second guide rail 112*b* may thus be arranged on the first and second side frame portions 109*a*, 109*b* of the fixed frame portion, respectively.

Preferably, a plurality of sliding blocks 114 can be attached to the side brackets 108*a*, 108*b* of the cassette 35. This enables a linear and guided movement of both the first and second side brackets 108*a*, 108*b*. In the illustrated embodiment, one sliding block 114*a*, 114*b* is provided on each side bracket 108*a*, 108*b*. This also further distributes and stabilizes the guidance of the movable frame portion 104. The sliding blocks 114*a*, 114*b* may be removably attached to the first and second side brackets 108*a*, 108*b*. For instance, removable fasteners, such as bolts or screws can be used for attaching the sliding blocks 114 to the first and second side brackets 108*a*, 108*b*. It is also possible to provide a plurality sliding blocks 114*a*, 114*b* to each vertical side of the brackets 108*a*, 108*b*; for instance one upper and one lower sliding block 114 on each side bracket 108*a*, 108*b*.

A displacement mechanism 120 is connected to the side brackets 108*a*, 108*b* and to the fixed frame portion 102. The displacement mechanism 120 comprises a motor 122, a first actuator 124*a* and a second actuator 124*b*.

In the illustrated embodiment, the actuators 124*a*, 124*b* are mechanical actuators. The mechanical actuators 124*a*, 124*b* are configured to convert a rotary displacement movement from the motor 122 into a linear displacement and thus displace the movable frame portion 104 in a vertical direction and in relation to the fixed frame portion 102.

Figure 13B:
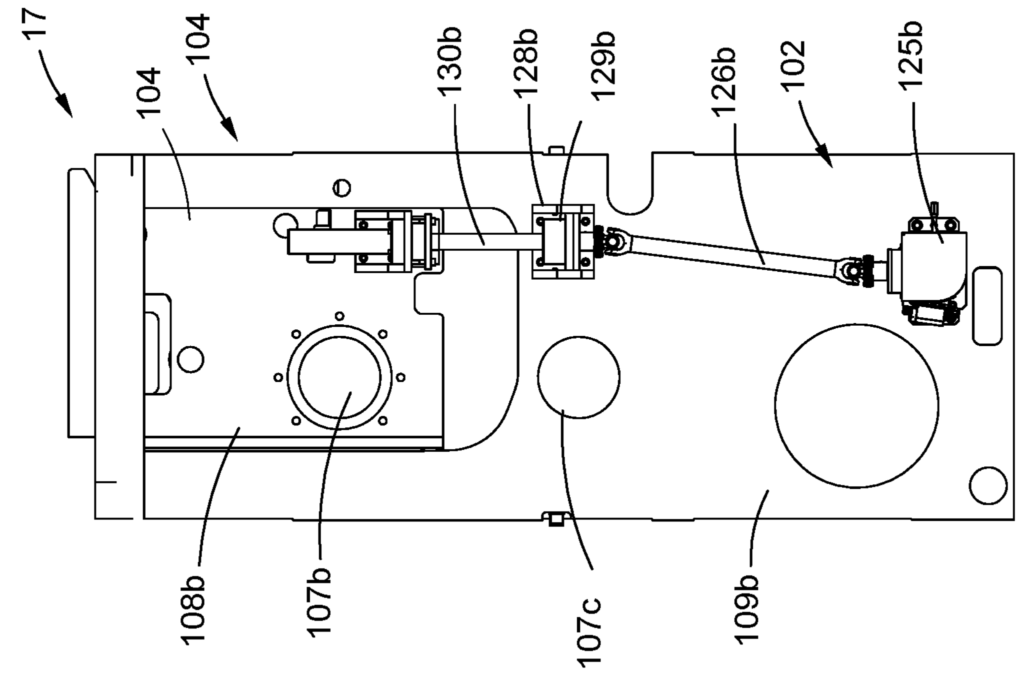
FIGS. 13*a* and 13*b* are schematic side-views of a structural frame of the flexographic printing unit of FIGS. 12*a* and 12*b;*
Figure 13A:
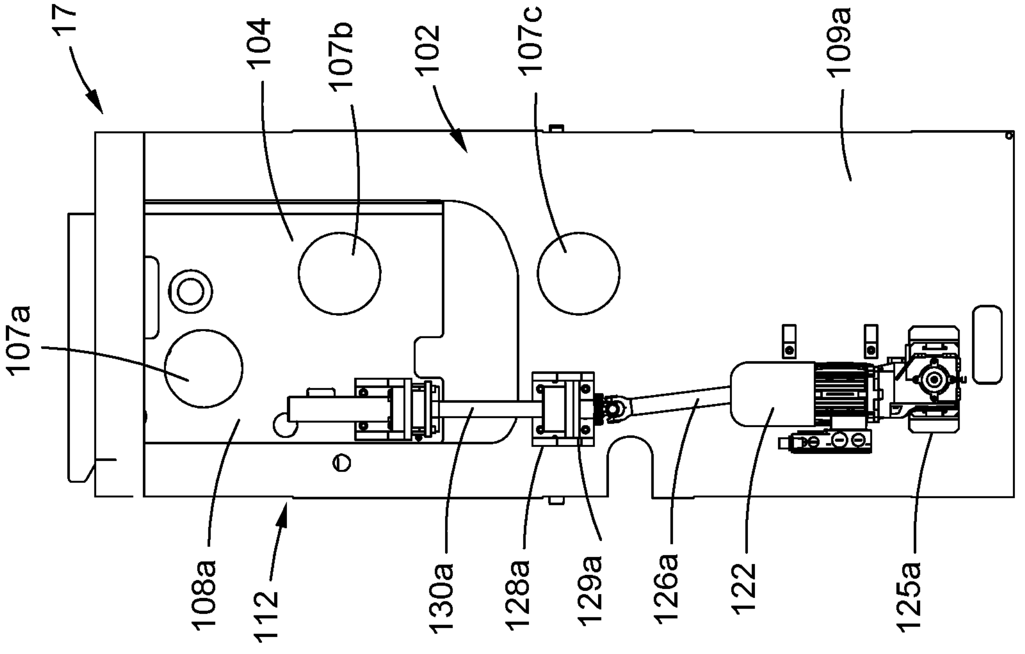

As illustrated in FIGS. 13 to 15, the first and second actuators 124*a*, 124*b* comprise vertical drive shafts 126*a*, 126*b* operationally connected to the motor 122, and first and second converters 128*a*, 128*b* configured to translate a rotating movement into a linear displacement.

Each of the converters 128*a*, 128*b* preferably comprises a bearing 129*a*, 129*b* having a threaded portion and a rotating shaft 130*a*, 130*b*. The rotating shafts 130*a*, 130*b* are provided with a first end 127 having a threaded portion received in the bearing 129*a*, 129*b*. The bearings 129*a*, 129*b* are preferably provided with an internal thread.

The motor 122 and the vertical drive shafts 126*a*, 126*b* transmit a rotating movement to the rotating shafts 130*a*, 130*b*, which in turn displace the bearings 129*a*, 129*b* in the vertical direction. The rotating shafts 130*a*, 130*b* can also be referred to as "rotatable shafts". Consequently, as the bearings 129*a*, 129*b* are fixedly connected to the first and second side brackets 108*a*, 108*b* of the movable frame portion 104, the cassette 35 moves in the vertical direction in response to a change of an angular position of the rotating shafts 130*a*, 130*b*. Preferably, second ends 137 of the first rotating shaft 130*a* and the second rotating shaft 130*b* are supported by connection flanges 131*a*, 131*b*. The connection flanges 131*a*, 131*b* may serve as abutment surfaces on which the weight of the cassette 35 is supported.

As best seen in FIGS. 14 and 15, the same motor 122 can be connected operationally to the first actuator 124*a* and the second actuator 124*b*, arranged on an opposite side from the motor 122.

To this effect, a horizontally arranged transmission shaft 132 extends horizontally under the cassette 35 and is configured to transfer torque from the motor 122 to the second actuator 124*b*.

A first end 132*a* of the transmission shaft 132 is connected to the motor 122 via an angle shaft (also referred to as an "angle diverter") 125*a*. A second angle shaft 125*b* is located at a second end 132*b* of the transmission shaft 132, which connects to the second vertical drive shaft 126*b*. The motor 122 is thus configured to distribute the torque between the first actuator 124*a* and the second actuator 124*b*. The first and the second actuators 124*a*, 124*b* move in unison to modify the angular position of the rotating shafts 130*a*, 130*b* to change the vertical position of the cassette 35.

The present displacement mechanism 120 provides an advantage that a precise displacement to the cassette 35 can be achieved. At the same time, once the rotation of the rotating shafts 130*a*, 130*b* is stopped, the cassette 35 is maintained in a fixed position. Additionally, the angle shafts 125*a*, 125*b* may comprise a brake mechanism configured to lock the rotational movement of the vertical drive shafts 126*a*, 126*b* such that the cassette 35 cannot descend when the motor 122 is stopped.

Now referring back to FIGS. 12*a* and 12*b*, which illustrate the vertical movement of the cassette 35 between an operating position A and a service position B. The operating position A (see FIG. 12*a*) corresponds to the printing position, and in which the printing cylinder 30 and the counter cylinder 32 are spaced apart at a distance suitable for printing the sheet 1. In the service position B (see FIG. 12*b*), the printing cylinder 30 is further spaced apart from the counter cylinder 32 than in the printing position A.

As seen in FIG. 12*a*, the doctor blade chamber 36 is positioned in or below eye-height of the machine operator and access to the printing cylinder 30 is limited. As illustrated in FIG. 12*b*, by moving the cassette 35 upwardly when changing the printing plate 31, the printing cylinder 30 can be positioned in a variable position, and according to the operator preferences. Ideally, the service position is set such that the operator can replace the printing plate 31 without bending. In such a way, the operator can get full visibility and access to the printing cylinder 30.

In an embodiment, the operating position A and the service position B can be stored in a peripheral memory 67 (see FIG. 2) of the flexographic printing module 16 (or in a centralized memory 27 of the converting machine 10). The operating position A is depending on the sheet thickness and the printing plate thickness and may vary between different jobs. The service position B may be adjusted based on the operator height and preferences. Preferably, the control unit 15 may retrieve the operating position A and the service position B from the memory 67 or 27 upon a command from the operator. The service position B can thus be automatically retrieved by the control unit 15 upon the receipt of a login script.

For instance, as the operator provides an input to the machine interface 11 to select the service position B, the control unit may automatically activate the displacement mechanism 120 such that the printing cylinder 30 is moved into the desired position. Similarly, once the printing plate 31 has been replaced, the displacement mechanism 120 may move the printing cylinder 30 to the operating position once a command on resuming operation has been received by the control unit 15.

In an embodiment, the control unit 15 may automatically retrieve the settings for the service position B based on operator login data into the operator interface.

Additionally, the memory 67 or 27 may further comprise positional data defining other service positions. The positional data comprises operating information to enable the control unit 15 to actuate the motor 122 and displace the movable frame portion 104 to a plurality of predefined positions. For instance, the memory 67, 27 may further comprise positional data for an anilox changing position. The cassette 35 in the anilox changing position may preferably be located vertically lower than in the position for changing the printing plate.

The invention claimed is:

1. A converting machine for printing and transforming a sheet into a packaging element for a box, the converting machine comprising:

a printing module comprising a first printing unit arranged to print on a top side of a sheet, and a second printing unit arranged to print on a bottom side of the sheet, and a conveying system configured to transport the sheet through the converting machine along a transportation path in a direction of conveyance, the conveying system comprising a first transfer unit configured to contact and transport the sheet on the bottom side of the sheet and a second transfer unit configured to contact and transport the sheet on the top side of the sheet, the transfer units comprising drive elements configured to move the sheet forward in the direction of conveyance and vacuum apertures arranged to adhere the sheet to the drive elements, wherein the converting machine further comprises an inversion transfer module arranged between the first printing unit and the second printing unit, the inversion transfer module comprising an inlet inversion vacuum transfer and an outlet inversion vacuum transfer, each configured to contact and transport a different side of the sheet, whereby the inversion transfer module is configured to change the side of adherence and transportation of the sheet, and each of the inlet inversion vacuum transfer and the outlet inversion vacuum transfer has an entrance and an exit, and wherein the inversion transfer module further comprises a first deflector and a second deflector, the first deflector is disposed at the exit of the inlet inversion vacuum transfer, and the second deflector is disposed at the entrance of the outlet inversion vacuum transfer.

2. The converting machine according to claim 1, wherein the printing module is a flexographic printing module and wherein the first printing unit comprises a top printing cylinder arranged to print on a top side of a sheet, and a second printing unit having a bottom printing cylinder arranged to print on a bottom side of the sheet.

3. The converting machine according to claim 1, wherein the first unit is arranged upstream of the second printing unit in the direction of conveyance, and wherein the inlet inversion vacuum transfer is configured to apply suction to the bottom side of the sheet.

4. The converting machine according to claim 1, wherein the inlet inversion vacuum transfer is driven in unison with an adjacent transfer unit of a closest upstream-located printing unit, whereby a speed of the inlet inversion vacuum transfer is equal to the speed of the transfer unit of the closest upstream-located printing unit, wherein the outlet inversion vacuum transfer is driven in unison with the transfer unit of a closest downstream-located printing unit, whereby a speed of the outlet inversion vacuum transfer is equal to the speed of the transfer unit of the closest downstream-located printing unit.

5. The converting machine according to claim 1, wherein the converting machine comprises a mobile part and a fixed part, and wherein the inversion transfer module is arranged as a transition element between the mobile part and the fixed part.

6. The converting machine according to claim 1, wherein the inversion transfer module is provided with displacement means, enabling a horizontal displacement of the inversion transfer module in relation to a printing unit.

7. The converting machine according to claim 1, wherein the inversion transfer module further comprises a pivotably movable locking part configured to engage with a corresponding mating geometry in a printing module such as to mechanically connect a housing of the inversion transfer module with a housing of the printing unit.

8. The converting machine according to claim 1, wherein the first deflector is arranged in an angle and defining an entry clearance and an exit clearance with the inlet inversion vacuum transfer, wherein the entry clearance is larger than the exit clearance, such that a funnel-shaped entry passage to the outlet inversion vacuum transfer is provided.

9. The converting machine according to claim 8, wherein the funnel-shaped entry passage gradually amplifies a concentration of vacuum force to the sheet.

10. The converting machine according to claim 8, wherein the funnel-shaped entry passage is configured to pass only one sheet at a time.

11. The converting machine according to claim 8, wherein the second deflector defines an entry clearance and an exit clearance with the outlet inversion vacuum transfer, wherein the second deflector is parallel to the outlet inversion vacuum transfer.

12. The converting machine according to claim 11, wherein the entry clearance is equal to the exit clearance.

13. The converting machine according to claim 11, wherein the exit clearance of the first deflector is larger than each of the entry clearance of the second deflector and the exit clearance of the second deflector.

14. The converting machine according to claim 11, wherein the entry clearance of the first deflector is larger than the entry clearance of the second deflector.

15. The converting machine according to claim 1, wherein the inlet inversion vacuum transfer is connected to a first vacuum generator and the outlet inversion vacuum transfer is connected to a second vacuum generator, wherein a vacuum-suction force of the inversion vacuum transfer configured to apply suction to the top side of the sheet is higher than the vacuum-suction force to the inversion vacuum transfer configured to apply suction to the bottom side of the sheet.

16. The converting machine according to claim 1, wherein a housing of the inversion vacuum transfer configured to apply suction to the top side of the sheet comprises separate suction compartments connected to an upper vacuum generator, wherein the compartments are defined by internal walls extending in the direction of conveyance and are arranged such that a centrally arranged suction compartment is provided, the centrally arranged suction compartment being arranged in-between a first lateral suction compartment and a second lateral suction compartment.

17. The converting machine according to claim 16, wherein the internal walls are configured as movable shutters, and wherein a suction force from the vacuum generator is distributed to the first lateral suction compartment and the second lateral suction compartment by opening the shutters, wherein a control unit is configured to control the movable shutters, and the control unit is configured to determine an optimal degree of opening of the shutters.

18. The converting machine according to claim 1, wherein the inlet inversion vacuum transfer is disposed within an inlet housing, and the outlet inversion vacuum transfer is disposed within an outlet housing, wherein each of the inlet housing and the outlet housing contains a plurality of suction openings.

19. The converting machine according to claim 18, wherein the inlet housing and the outlet housing overlap in the direction of conveyance by a distance.

20. The converting machine according to claim 19, wherein the distance allows for a first suction opening in the outlet housing to be further in the direction of conveyance than a last suction opening in the inlet housing.

* * * * *